United States Patent
Fakoorian et al.

(10) Patent No.: US 12,455,338 B2
(45) Date of Patent: Oct. 28, 2025

(54) USING NON-POSITIONING SIGNALS FOR POSITIONING IN DOWNLINK AND/OR UPLINK

(71) Applicant: APPLE INC., Cupertino, CA (US)

(72) Inventors: Seyed Ali Akbar Fakoorian, San Diego, CA (US); Chunxuan Ye, San Diego, CA (US); Dawei Zhang, Saratoga, CA (US); Haitong Sun, Cupertino, CA (US); Hong He, San Jose, CA (US); Jie Cui, San Jose, CA (US); Oghenekome Oteri, San Diego, CA (US); Sigen Ye, San Diego, CA (US); Wei Zeng, Saratoga, CA (US); Weidong Yang, San Diego, CA (US); Yushu Zhang, Beijing (CN); Zhibin Wu, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/476,054

(22) Filed: Sep. 27, 2023

(65) Prior Publication Data

US 2024/0019521 A1    Jan. 18, 2024

Related U.S. Application Data

(63) Continuation of application No. 17/593,695, filed as application No. PCT/CN2020/119766 on Oct. 1, 2020, now Pat. No. 12,025,721.

(51) Int. Cl.
*H04W 4/00* (2018.01)
*G01S 5/00* (2006.01)
(Continued)

(52) U.S. Cl.
CPC .............. *G01S 5/0036* (2013.01); *G01S 5/10* (2013.01); *H04L 5/0012* (2013.01);
(Continued)

(58) Field of Classification Search
None
See application file for complete search history.

(56) References Cited

U.S. PATENT DOCUMENTS 11,516,652 B2 * 11/2022 Zhou ................. H04L 5/0051
2018/0220392 A1   8/2018 Ly
(Continued)

FOREIGN PATENT DOCUMENTS

CN         102056290 A    5/2011
CN         110557719 A    12/2019
(Continued)

OTHER PUBLICATIONS

International Search Report and Written Opinion, PCT/CN2020/119766, Jun. 25, 2021, 9 pages.
(Continued)

*Primary Examiner* — Zewdu A Beyen
(74) *Attorney, Agent, or Firm* — Dorsey & Whitney LLP

(57) ABSTRACT

Systems and methods of a wireless communications system using signals not traditionally used for positioning purposes for positioning measurements in both uplink (UL) and downlink (DL) are described herein. A user equipment (UE) may generate a UE capability information message indicating one or more signal types that the UE can process for DL positioning measurements and/or that the UE can send for UL positioning measurements. The one or more signal types so indicated may include signals not traditionally used for positioning measurements. The UE may send, to the base station, the UE capability information message. The wireless communications system may then configure the base station and/or the UE to use such signal types with one or more positioning methods. In some embodiments, the base station may also indicate to the UE a subset of signals of an
(Continued)

indicated type which should be processed for DL measurements/sent for UL measurements.

18 Claims, 11 Drawing Sheets

(51) Int. Cl.
| | | |
|---|---|---|
| *G01S 5/10* | (2006.01) | |
| *H04L 5/00* | (2006.01) | |
| *H04W 64/00* | (2009.01) | |
| *H04W 72/0446* | (2023.01) | |
| *H04W 72/51* | (2023.01) | |
| *H04W 74/08* | (2009.01) | |
| *H04W 74/0833* | (2024.01) | |

(52) U.S. Cl.
CPC ........... *H04L 5/0051* (2013.01); *H04W 64/00* (2013.01); *H04W 72/0446* (2013.01); *H04W 72/51* (2023.01); *H04W 74/0866* (2013.01); *H04W 74/0833* (2013.01)

(56) References Cited

U.S. PATENT DOCUMENTS

| | | |
|---|---|---|
| 2020/0053703 A1 | 2/2020 | Akkarakaran et al. |
| 2020/0107286 A1 | 4/2020 | Akkarakaran et al. |
| 2021/0112541 A1* | 4/2021 | Manolakos ....... H04W 72/0453 |
| 2021/0185632 A1* | 6/2021 | Manolakos ........... H04L 5/0094 |
| 2021/0219259 A1 | 7/2021 | Da et al. |
| 2021/0298117 A1 | 9/2021 | Zhou et al. |
| 2021/0333410 A1* | 10/2021 | Gum ....................... G01S 19/48 |
| 2021/0360733 A1 | 11/2021 | Bao |
| 2022/0065978 A1 | 3/2022 | Manolakos et al. |
| 2024/0072963 A1* | 2/2024 | Zhang .................... H04L 5/001 |

FOREIGN PATENT DOCUMENTS

| | | |
|---|---|---|
| WO | 2018144667 A1 | 8/2018 |
| WO | 2020091658 A1 | 5/2020 |
| WO | 2020154289 A1 | 7/2020 |
| WO | 2020164743 A1 | 8/2020 |

OTHER PUBLICATIONS

VIVO, "Remaining issues on UE and gNB measurements for NR positioning", R1-1912046, 3GPP TSG RAN WG1 #99, Reno, Nevada, Agenda Item 7.2.10.3, Nov. 18-22, 2019, 8 pages.

U.S. Appl. No. 17/593,695, Non-Final Office Action, May 17, 2023, 10 pages.

U.S. Appl. No. 17/593,695, Final Office Action, Nov. 14, 2023, 10 pages.

Moderator (NTT DOCOMO, Inc.), "Summary on [101-e-NR-UEFeatures-Positioning-02]", R1-2004822, 3GPP TSG RAN WG1 #101, e-Meeting, Agenda Item 7.2.11.8, May 25-Jun. 5, 2020, 122 pages.

U.S. Appl. No. 17/593,695, Notice of Allowance, Mar. 14, 2024, 7 pages.

* cited by examiner

USING NON-POSITIONING SIGNALS FOR POSITIONING IN DOWNLINK AND/OR UPLINK

TECHNICAL FIELD

This application relates generally to wireless communication systems, including determining a physical position of a UE using measurements of signals between the UE and a base station.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Accurate data regarding a physical position of a UE may be of use at one or more entities of a wireless communications system in which the UE operates (e.g., a UE, a base station, etc.). For example, it may be helpful to know a physical position of a UE with high accuracy so that tracking, handover, and other functions of the wireless communications network that directly relate to the physical operation of the UE within the wireless communications system are improved (correspondingly to the high accuracy). As another example, user applications that operate on or within the wireless communications system (e.g., applications that operate at least in part on one or more of the UE, the base station, or another entity of the wireless communications system) and which may further communicate with other entities within the wireless communication system relative to such location information may also benefit from access to information regarding the physical positioning of a UE with high accuracy. It has also been noted that the process of determining a location of the UE within a wireless communications system involves the use of system resources (e.g., it may involve the use of signaling resources between the UE and the base station, and/or processing resources at one or more of the UE, the base station, and/or another entity of the wireless communications system, etc.). Accordingly, to the extent that the speed at which signaling and/or processing related to UE positioning occurs can be improved (e.g., made faster), applications using such data can be improved (e.g., through their faster access to UE location data making it possible for them to improve the speed of completion of their UE positioning related processes). Further, to the extent that fewer overall resources of the wireless communications system can be used corresponding to the signaling and/or processing used to determine an accurate location of the UE, efficiency (e.g., power use) at the UE, the base station, and/or another entity of the wireless communications system can be improved (e.g., less power overall can be used). Accordingly, it has been recognized that procedures for (any of) improved accuracy, reduced latency, network efficiency, device efficiency, and improved integrity (e.g., a measure of trust that can be placed in correctness) relative to the determination of a location of a UE would be of value to operators and users of such wireless communications systems.

Figure 1:
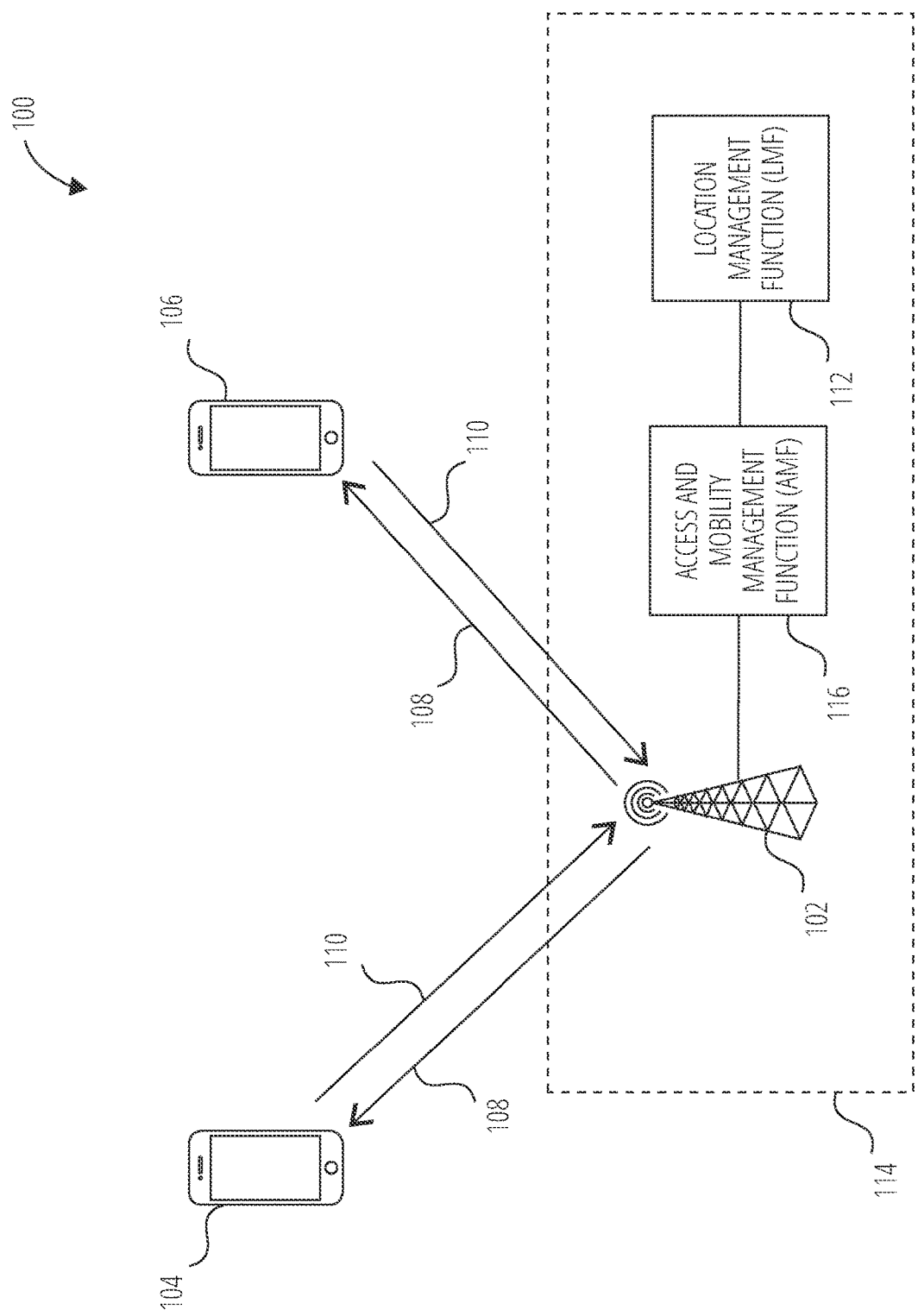
FIG. 1 illustrates a wireless communications system according to an embodiment.

FIG. 1 illustrates a wireless communications system 100 according to an embodiment. The wireless communications system 100 includes a base station 102, a first UE 104, a second UE 106, a location management function (LMF) 112, and an access and mobility management function (AMF) 116 with the base station 102, the LMF 112, and the AMF 116 illustrated as part of a core network 114 of the wireless communications system 100. The wireless communications system 100 is given by way of example and not by way of limitation; wireless communications systems with more or less than these elements are contemplated.

Each of the first UE 104 and the second UE 106 may communicate with the base station 102 using either and/or both of downlink (DL) signals 108 (which are transmitted from the base station 102 to the respective UE) and/or uplink (UL) signals 110 (which are transmitted from the respective UE to the base station 102).

In some wireless communications systems (such as, e.g., the wireless communications system 100), given positioning signals may be defined for use by the UE in downlink (DL) and in uplink (UL). These positioning signals may be provided to help the wireless communications system 100 determine a physical position of a UE. For example, in DL, the wireless communications system 100 may define for the use of a DL positioning reference signal (DL-PRS) to be received and measured at the UE for such purposes. As a further example, in UL, the wireless communications system 100 may define for the use of a sounding reference signal for positioning (Pos-SRS) to be received and measured at the base station for such purposes.

It has been recognized that a UE and/or a base station of a wireless communication system (such as, e.g., the wireless communications system 100) may be further configured to use other signals in DL and/or UL, as relevant, in order to perform positioning measurements/calculations, in order to achieve some or all of the benefits described above. These other signals may be signals that are used in the wireless communications system 100, but that traditionally have not been used/measured for purposes of determining physical UE positioning. Such signals may be referred to as "non-positioning signals" in this disclosure. For example, some DL non-positioning signals in the wireless communications system 100 for which it has been recognized may be useful for positioning-related measurements/calculations include (but are not necessarily limited to) synchronization signal blocks (SSBs), primary synchronization signals (PSSs) (e.g., as found within an SSB), secondary synchronization signals (SSSs) (e.g., as found within an SSB), physical broadcast channels (PBCH) (e.g., as found within an SSB), demodulation reference signals (DMRSs), channel state information reference signals (CSI-RSs), and tracking reference signals (TRSs). As a further example, some UL non-positioning signals in the wireless communications system 100 for which it has been recognized may be useful for positioning-related measurements/calculations include (but are not necessarily limited to) sounding reference signals for multiple input multiple output (mimo-SRSs), physical random access channels (PRACHs), and physical uplink shared channel demodulation reference signals (PUSCH DMRSs).

It is contemplated that in embodiments herein, non-positioning signals may be used in addition to positioning signals in various positioning methods. It is also contemplated that in some embodiments discussed herein, non-positioning signals may be used instead of positioning signals in various positioning methods. Positioning methods with which non-positioning signals may be used may include (but are not limited to) observed time difference of arrival (OTDOA) positioning, DL angle of departure (DL-AoD) positioning, DL-time difference of arrival (DL-TDOA) positioning, Enhanced Cell-ID (EID) positioning, UL angle of arrival (UL-AoA) positioning, UL-time difference of arrival (UL-TDOA) positioning, and multi-round trip time (Multi-RTT) positioning. More broadly, it is contemplated that non-positioning signals may be used in the manner disclosed herein with, for example, various ones of the positioning methods discussed in 3GPP Technical Specification (TS) 38.305 (version 16.1.0, July 2020).

The use of one or more positioning methods using the described DL and/or UL positioning and/or non-positioning signals may be coordinated and/or controlled by the LMF 112. Measurements taken according to these methods by the base station 102 may be communicated to the LMF 112. Measurements taken according to these methods by a UE (e.g., either of the first UE 104 or the second UE 106) may be first communicated to the base station 102 by the respective UE and then forwarded to the LMF 112. The LMF 112 may be the entity of the wireless communications system 100 that finally makes the actual determination of the relevant UE's physical position using the reported measurements. In some embodiments of a wireless communications system, the LMF 112 may interact with some or all of the rest of the core network 114 via the AMF 116.

The use of non-positioning signals for such positioning purposes may be enabled by wireless communications systems with capabilities that are not present in earlier systems. The wireless communications system 100 may exemplify one or more of these improved capabilities. For example, the base station 102, the first UE 104, and/or the second UE 106 of the wireless communications system 100 may make extensive use of recent advances in beamforming, which may allow the base station 102 to deliver one or more DL non-positioning signals to one or more of the first UE 104 and/or the second UE 106 (and/or the first UE 104 and/or the second UE 106 to deliver one or more UL non-positioning signals to the base station 102) with a much higher and/or consistent measured RSRP (or with otherwise increased and/or constant reception quality). As another example, recent improvements to coverage enhancement capabilities may enable the detection of a measuring cell even in deep indoor channel conditions. Accordingly, in whichever case(s), non-positioning signals which previously may not have been suited for positioning may now be so suited.

Using Non-Positioning Signals in DL for Network Efficiency

In some wireless communications systems, various positioning methods may anticipate the use of DL positioning signals, such as DL-PRS. In such systems, DL positioning signals can be configured in different periodicities and/or bandwidths, at the cost of network efficiency (e.g., at the cost of additional power use at the base station) as well as in costs in terms of spectrum resource use. It has been recognized that by re-using (already-in-use) DL non-positioning signals for DL positioning measurements at the UE in relevant positioning methods (in place of, e.g., a more complicated and/or frequent scheduling for the DL positioning signals according to DL positioning signal-related messaging described), the network efficiency costs (and other costs) associated with determining UE positioning using only DL measurements of DL positioning signals can be reduced. The result is that, under the methods described herein, the wireless communications system may be able to configure the base station to 1) cancel a transmission of one or more scheduled DL positioning signals and/or 2) allocate and/or send fewer DL positioning signals than would otherwise be needed going forward, leading to the described improvements to network efficiency (and other costs). Leveraging such methodology may be of particular interest in the case where high positioning accuracy (e.g., as may result from the use of specifically DL positioning signals for positioning measurements) is not necessarily required.

The capability of the UE to process one or more types of signals for DL positioning measurements may be indicated to the base station in a UE capability information message to the base station. This UE capability information message may include an indication of DL positioning signals which the UE can process for DL positioning measurements and/or an indication of DL non-positioning signals that the UE can process for DL positioning measurements. In this way, the wireless communications system is informed as to the UE capability and may reconfigure accordingly (which may include, e.g., the canceling of and/or adjusting the amount and/or timing of DL positioning signals sent by the base station in the manner described above). Further, it is contemplated that in some cases, certain DL positioning signals may be assumed to be active within the wireless communications system. Accordingly, to reduce complexity, it may be that the UE capability information message may indicate only, for example, DL non-positioning signals that can (also, or alternatively) be processed by the UE for DL positioning measurements, and/or any DL positioning signals which the wireless communications system has not already assumed to be active that can (also, or alternatively) be processed by the UE for DL positioning measurements).

It is also contemplated that this UE capability information message may further include (or not) the indications relative to UL signals as described below.

According to information found in the UE capability information message, DL non-positioning signals may be used in methods involving DL positioning measurements (either in addition to, or alternatively to, DL positioning signals used in such methods). These methods may include, for example, OTDOA positioning, EID positioning, DL-AoD positioning, DL-TDOA positioning, and Multi-RTT positioning.

The DL non-positioning signals processed at the UE for DL positioning measurements as part of these methods may depend on the capability of the UE. Under some UE capabilities, one or more SSBs may be processed for DL positioning measurements. In other cases, portion(s) of one or more SSBs may be processed for DL positioning measurements (e.g., an SSS, a PSS, a PBCH, or a DRMS in the PBCH of the one or more SSBs may be used for positioning measurements). Under some UE capabilities, one or more CSI-RSs may be processed by the UE for DL positioning measurements. Under some UE capabilities, one or more TRSs may be processed by the UE for DL positioning measurements.

In some cases, the base station may, in response to the UE capability information message, indicate to the UE a subset (or subsets) of signals of the indicated type(s) which should be used for DL positioning measurements. For example, in cases involving the processing at the UE of SSBs (or portion(s) thereof) for DL positioning measurements corresponding to an indication in UE capability information message, the base station may indicate to a UE a subset of the SSBs that are sent by the base station that are to be so processed by the UE for DL positioning measurements.

It is also contemplated that one or more DL non-positioning signals other than the DL non-positioning signals discussed above may also be used with (or alternatively to) a DL positioning signal (e.g., a DL-PRS) in methods using DL positioning measurements, in the manner described.

In some wireless communications systems, DL-PRSs are expected to be configured with a measurement gap (MG). In these systems, it may be that the maximum ratio of the measurement gap length (MGL) over the measurement gap repetition period (MGRP) is no more than a given amount (e.g., 30%).

Accordingly, a UE may indicate (e.g., via the UE capability information message) to the base station that signals of at least two signal types can be processed for DL positioning measurements (as described above) when such signals are received in a same time resource, a same frequency resource, or a same time and frequency resource. For example, the UE capability information message may indicate that signals of the at least two signal types can be processed for DL positioning measurements when such signals are received in the same slot, the same subframe, the same measurement gap, or the same period of time. As another example, the UE capability information message may indicate that signals of the at least two signal types can be processed for DL positioning measurements when such signals are received in the same band, bandwidth, band combination (BC), bandwidth part (BWP), or component carrier (CC). As another example the UE capability information message may indicate that signals of the at least two signal types can be processed for DL positioning measurements when such signals are received in the same slot and BWP, the same subframe and the same CC, the same T ms and the same W Hz, etc. (with many other such combinations making up a time and frequency resource contemplated). Note that this may be different from a wireless communications system where a UE is not expected to receive, e.g., DL-PRS on symbols for other DL signals.

In some examples of this indication, the UE may explicitly indicate the at least two signal types. For example, the UE may explicitly indicate that the at least two signal types include DL-PRSs and SSB. In other examples, the UE may make the indication that two signal types can be so processed by explicitly indicating only a DL non-positioning signal type(s) (e.g., indicating only SSB). In these cases, the various elements of the wireless communications system may implicitly understand that a certain type of DL positioning signal (e.g., a DL-PRS) is to be one of the at least two signal types to be received in the same time resource, the same frequency resource, or the same time and frequency resource when the indication of the non-positioning signal type(s) that can be received in the same time resource, the same frequency resource, or the same time and frequency resource by the UE is received. This implicit indication may be used in cases where the DL positioning signal being implicitly indicated as one of the at least two signal types is the same as a DL positioning signal assumed to be active within the wireless communications system, and therefore not indicated in the UE capability information message in the first instance (as described above).

In cases where an indication that at least two signal types that can be processed for DL positioning measurements when such signals are received in a same time resource, a same frequency resource, or a same time and frequency resource is made, the UE may also indicate (e.g., via the UE capability information message) to the base station a maximum supported number of signals of the at least two signal types (together) that can be processed by the UE for DL positioning measurements when received in a same time resource, a same frequency resource, or a same time and frequency resource. In these embodiments, the UE may further indicate (e.g., via the UE capability information message) an upper timing limitation on the signals of the at least two signal types (together) that can be processed by the UE for DL positioning measurements when received in the same time resource, the same frequency resource, or the same time and frequency resource. This indication may be made in terms of a maximum time (for each of the at least two signal types combined) within a given time period (e.g., a maximum number of milliseconds that the UE can use for this processing every T ms). This indication may alternatively be in terms of a maximum time (for each of the at least two signal types combined) within a given slot periodicity (e.g., a maximum number of milliseconds that the UE can use for this processing every T slots).

The indication of the maximum supported number of signals can be indicated on a per-band and/or a per-BC basis (e.g., the indication may indicate a band or BC for which the indication of the maximum supported number of signals of the at least two signal types that can be processed by the UE for DL positioning measurements when received in the same time resource, the same frequency resource, or the same time and frequency resource applies).

In other cases where an indication that at least two signal types that can be processed for DL positioning measurements when such signals are received in a same time resource, a same frequency resource, or a same time and frequency resource is made, the UE may also indicate (e.g., via the UE capability information message) to the base station a maximum supported number of one or both of the at least two signal types (separately) that can be processed by the UE for DL positioning measurements when received in the same time resource, the same frequency resource, or the same time and frequency resource. In these cases, the UE may indicate a maximum supported number of signals of a first of the at least two signal types. Additionally or alternatively, the UE may indicate a maximum supported number of signals of a second of the at least two signal types. In some cases, the UE may make both indications (separately) regarding the first of the at least two signal types and the second of the at least two signal types. It is contemplated that either of the first and second of the at least two signal types may (independently) represent a DL positioning signal or a DL non-positioning signal.

In whatever case, the wireless communications system may configure the base station to send signals of each of the at least two signal types that can be processed by the UE for DL positioning measurements in the same time resource, the same frequency resource, or the same time and frequency resource, according to the capabilities indicated by the UE.

In some cases, a UE may not indicate (e.g., via the UE capability information message) to the base station that signals of at least two signal types can be processed for DL positioning measurements (as described above) when such signals are received in a same time resource, a same frequency resource, or a same time and frequency resource. In these cases, the wireless communications system may configure separate time and/or frequency resources for the two signal types (e.g., a first MG for a first signal type of DL-PRS and a second MG for a second signal type of SSB).

While preceding examples have, in various locations, usually used DL-PRS and/or SSB by way of example, it is expressly contemplated that other DL positioning signals than DL-PRS and/or other DL non-positioning signals than SSB may be similarly applied corresponding to such examples. It is further contemplated that the examples above could combine the use of multiple DL positioning signals and/or multiple DL non-positioning signals.

It is also contemplated that the use of DL non-positioning signals for positioning purposes may be either combined with or used independently of the use of UL non-positioning signals for UE positioning purposes (as described below) within a wireless communications system.

Figure 2:
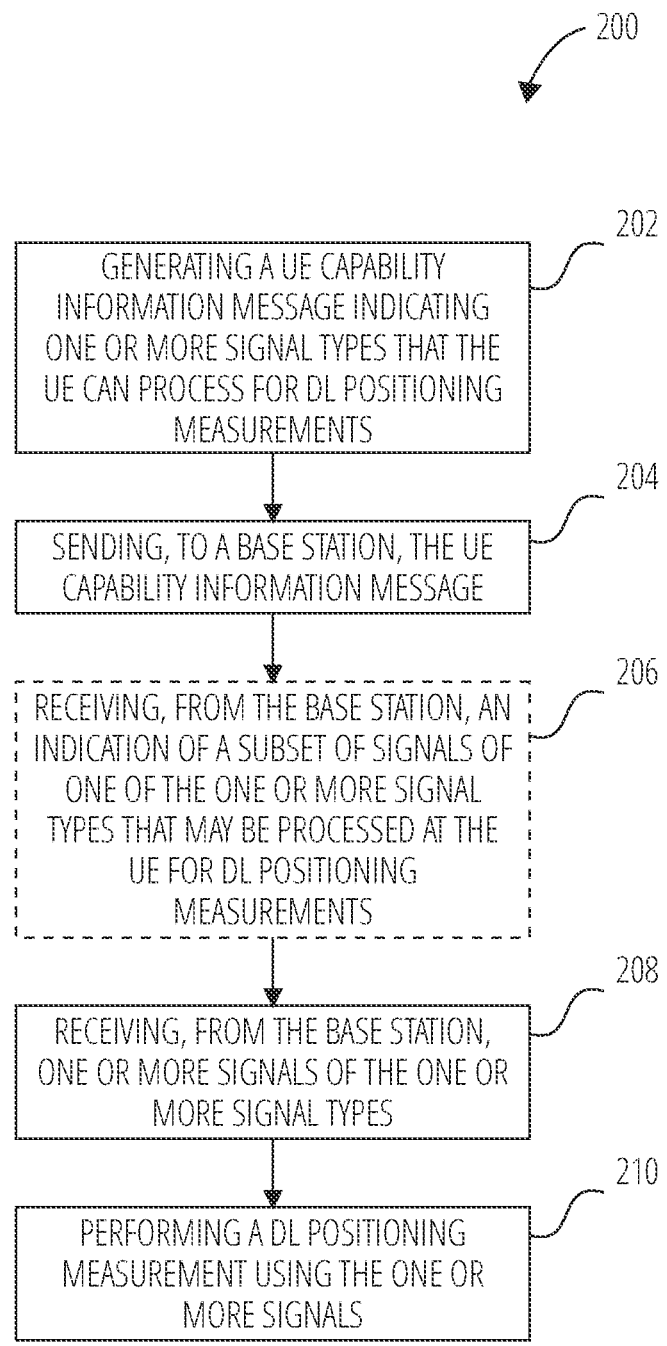
FIG. 2 illustrates a method of a user equipment (UE), according to an embodiment.

FIG. 2 illustrates a method 200 of a UE, according to an embodiment. The method 200 includes generating 202 a UE capability information message indicating one or more signal types that the UE can process for DL positioning measurements.

The method 200 further includes sending 204, to a base station, the UE capability information message.

The method 200 further optionally includes receiving 206, from the base station, an indication of a subset of one of the one or more signal types that may be processed at the UE for DL positioning measurements.

The method 200 further includes receiving 208, from the base station, one or more signals of the one or more signal types.

The method 200 further includes performing 210 a DL positioning measurement using the one or more signals.

Figure 3:
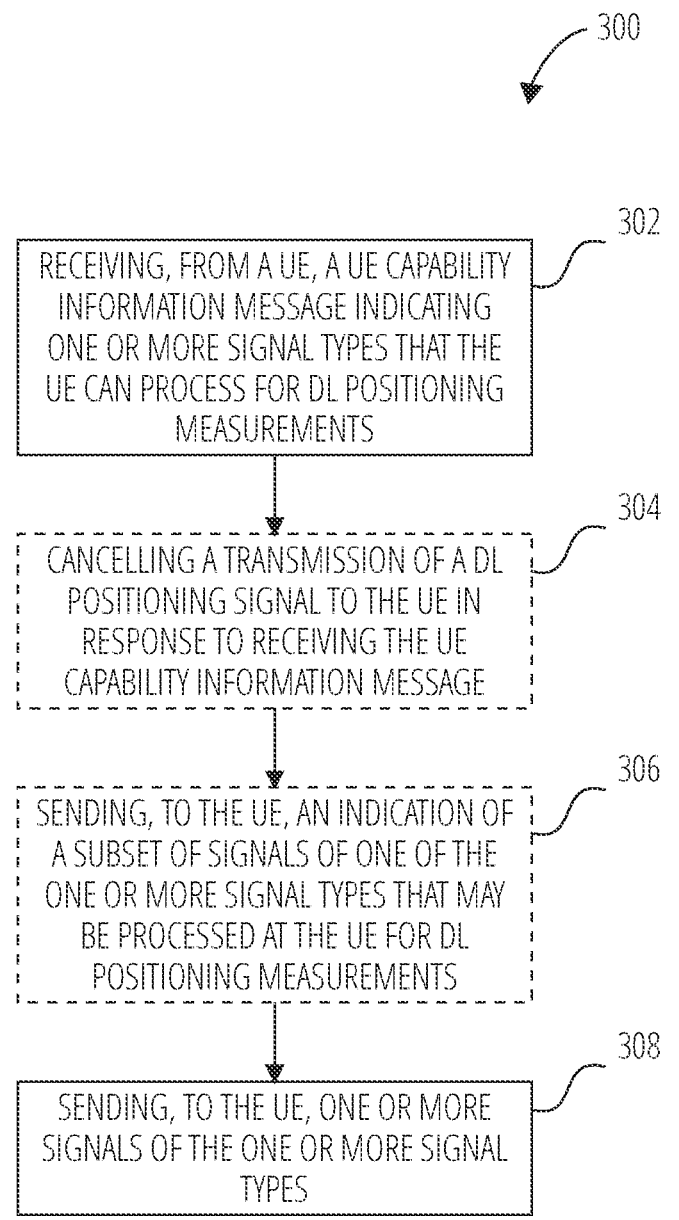
FIG. 3 illustrates a method of a base station, according to an embodiment.

FIG. 3 illustrates a method 300 of a base station, according to an embodiment. The method 300 includes receiving 302, from a UE, a UE capability information message indicating one or more signal types that the UE can process for DL positioning measurements.

The method 300 further optionally includes cancelling 304 a transmission of a DL positioning signal to the UE in response to receiving the UE capability information message.

The method 300 further optionally includes sending 306, to the UE, an indication of a subset of signals of the one or more signal types that may be processed at the UE of DL positioning measurements.

The method 300 further includes sending 308, to the UE, one or more signals of the one or more signal types.

Using Non-Positioning Signals in UL for Device Efficiency

In some wireless communications systems, various positioning methods may anticipate the use of UL positioning signals, such as Pos-SRS. While the UE of these wireless communications systems may be configured to send other UL (non-positioning) signals to a base station (e.g., mimo-SRS signals, as one example), the wireless communications system may not be configured to use these signals for UL positioning measurements. Accordingly, a separate and/or specific UL transmission of a UL positioning signal may be used (for example, a separate and/or specific UL transmission of a Pos-SRS as part of an SRS-Pos_Res signaling pattern is scheduled). The use of separate and/or specific UL transmission(s) of UL positioning signals has attendant device efficiency costs (e.g., in power use at the UE) as well as in costs in terms of spectrum resource use. It has been recognized that by re-using (already-in-use) UL non-positioning signals for UL positioning measurements at the base station in relevant positioning methods (in place of, e.g., some or all of the UL positioning signal-related messaging described), the device efficiency costs (and other costs) associated with determining UE positioning using only UL measurements of UL positioning signals can be reduced. The result is that, under the methods described herein, the wireless communications system may be able to configure the UE to 1) cancel a transmission of one or more scheduled UL positioning signals and/or 2) allocate and/or send fewer UL positioning signals than would otherwise be needed going forward, leading to the described improvements to device efficiency (and other costs). Leveraging such methodology may be of particular interest in the case where high positioning accuracy (e.g., as may result from the use of specifically UL positioning signals for positioning measurements) is not necessarily required.

The capability of the UE to send one or more types of UL signals for use in UL positioning measurements may be indicated to the base station in a UE capability information message to the base station. The UE capability information message may include an indication of UL positioning signals which the UE can send for UL positioning measurements and/or an indication of UL non-positioning signals that the UE can send for UL positioning measurements. In this way, the wireless communications system is informed as to the UE capability and may reconfigure accordingly (which may include, e.g., the canceling of and/or adjusting the amount and or timing of UL positioning signals expected at the base station, consistent with the UE changes described above). Further, it is contemplated that in some cases, certain UL positioning signals may be assumed to be active within the wireless communications system. Accordingly, to reduce complexity, it may be that the UE capability information message may indicate only, for example, UL non-positioning signals that can (also, or alternatively) be sent by the UE for UL positioning measurements, and/or any UL positioning signals which the wireless communications system has not already assumed to be active that can (also, or alternatively) be processed by the UE for UL positioning measurements).

It is also contemplated that this UE capability information message may further include (or not) the indications relative to DL signals as described previously.

According to information found in the UE capability information message, UL non-positioning signals may be used in methods involving UL positioning measurements (either in addition to, or alternatively to, UL positioning signals used in such methods). These methods may include, for example, UL-AoA positioning, UL-TDOA positioning, and Multi-RTT positioning.

The UL non-positioning signals sent by the UE for UL positioning measurements as part of these methods may depend on the capability of the UE. Under some UE capabilities, one or more mimo-SRSs may be sent for UL positioning measurements. Under some UE capabilities, one or more PRACHs may be sent for UL positioning measurements. Under some UE capabilities, one or more PUSCH DMRSs may be sent for UL positioning measurements.

In some cases, the base station may, in response to the UE capability information message, indicate to the UE a subset (or subsets) of signals of the indicated type(s) which should be sent for UL positioning measurements. For example, in cases involving the sending from the UE of mimo-SRSs for UL positioning measurements, the base station may indicate to the UE a subset of the mimo-SRS sent by the UE that may be sent for UL positioning measurements.

It is also contemplated that one or more UL non-positioning signals other than the UL non-positioning signals discussed above may also be used with (or alternatively to) a UL positioning signal (e.g., a Pos-SRS) in methods using UL positioning measurements, in the manner described.

In some wireless communications systems, it may be that one or more UL positioning signals (e.g., a Pos-SRS) can be transmitted to the base station starting in any symbol of a slot used by the UE to send the UL positioning signal. It is contemplated that a wireless communication system may further be configured to allow UL non-positioning signals (e.g., mimo-SRS) to also be transmitted to the base station starting in any symbol of a slot used by the UE to send the UL non-positioning signal. This may facilitate a more straightforward use of UL non-positioning signals for UL positioning measurements within the wireless communications system. A UE capability information message may indicate that the UE is capable of transmitting one or more UL non-positioning signals starting in any symbol of a slot used by the UE for the transmission of the UL non-positioning signal.

In some wireless communications systems, it may be that one or more UL non-positioning signals (e.g., a mimo-SRS) may be sent by the UE according to one or more of an inter-slot frequency hopping scheme, an intra-slot frequency hopping scheme, and a slot repetition scheme. It is contemplated that a wireless communication system may further be configured to allow UL positioning signals (e.g., Pos-SRS) to also be transmitted to the base station according to one or more of an inter-slot frequency hopping scheme, an intra-slot frequency hopping scheme, and a slot repetition scheme. This may facilitate simpler integration of UL positioning signal use within the wireless communications system (e.g., in the case where such system already allows such schemes for UL non-positioning signals, which may now be eligible to be used for UL positioning measurements). Further, this may enhance the ultimate accuracy of the result of some UE positioning methods using these UL positioning signals for UL positioning measurements. A UE capability information message may indicate that a UL positioning signal type (e.g., a Pos-SRS type) may be sent by the UE according to one or more of an inter-slot frequency hopping scheme, an intra-slot frequency hopping scheme, and a slot repetition scheme.

A UE that can send UL non-positioning signals for UL positioning measurements may further indicate (e.g., via the UE capability information message) to the base station that signals of at least two signal types can be sent by the UE in a same time resource, a same frequency resource, or a same time and frequency resource. For example, the UE capability information message may indicate that signals of the at least two signal types can be sent for UL positioning measurements in the same slot, the same subframe, the same measurement gap, or the same period of time. As another example, the UE capability information message may indicate that signals of the at least two signal types can be sent for UL positioning measurements in the same band, bandwidth, BC, BWP, or CC. As another example the UE capability information message may indicate that signals of the at least two signal types can be sent for UL positioning measurements in the same slot and BWP, the same subframe and the same CC, the same T ms and the same W Hz, etc. (with many other such combinations making up a time and frequency resource contemplated).

In one example of this indication, the UE may explicitly indicate the at least two signal types. For example, the UE may explicitly indicate that the at least two signal types include Pos-SRS and mimo-SRS. In other examples, the UE may make the indication that two signal types can be so sent by explicitly indicating only a UL non-positioning signal type(s) (e.g., indicating only mimo-SRS). In these cases, the various elements of the wireless communications system may implicitly understand that a certain type of UL positioning signal (e.g., a Pos-SRS) is to be one of the at least two signal types to be sent in the same time resource, the same frequency resource, or the same time and frequency resource when the indication of the non-positioning signal type(s) that can be sent in the same time resource, the same frequency resource, or the same time and frequency resource by the UE is received. This implicit indication may be used in cases where the UL positioning signal being implicitly indicated as one of the at least two signal types is the same as a UL positioning signal assumed to be active within the wireless communications system, and therefore not indicated in the UE capability information message in the first instance (as described above).

In cases where an indication of at least two signal types that can be sent in the same time resource, the same frequency resource, or the same time and frequency resource for UL positioning measurements is made, the UE may also indicate (e.g., via the UE capability information message) to the base station a maximum supported number of signals of the at least two signal types (together) that can be sent by the UE for DL positioning measurements within the same time resource, the same frequency resource, or the same time and frequency resource.

In other cases where an indication of at least two signal types that can be sent in the same time resource, the same frequency resource, or the same time and frequency resource for UL positioning measurements is made, the UE may instead indicate (e.g., via the UE capability information message) that a maximum supported number of one or both of the at least two signal types (separately) that can be sent by the UE for DL positioning measurements within the same time resource, the same frequency resource, or the same time and frequency resource. In these cases, the UE may indicate a maximum supported number of signals of a first of the at least two signal types. Additionally or alternatively, the UE may indicate a maximum supported number of signals of a second of the at least two signal types. In some cases, the UE may make both indications (separately) regarding the first of the at least two signal types and the second of the at least two signal types. It is contemplated that either of the first and second of the at least two signal types may (independently) represent a UL positioning signal or a UL non-positioning signal.

In whatever case, the wireless communications system may configure the UE to send signals of each of the at least two signal types that can be sent by the UE for DL positioning measurements in the same time resource, the same frequency resource, or the same time and frequency resource, according to the capabilities indicated by the UE.

In some cases, a UE may not indicate (e.g., via the UE capability information message) to the base station that signals of at least two signal types can be sent for DL positioning measurements (as described above) within a same time resource, a same frequency resource, or a same time and frequency resource. In these cases, the wireless communications system may configure separate time and/or frequency resources for the two signal types (e.g., a first BWP for a first signal type of Pos-SRS and a second BWP for a second signal type of mimo-SRS).

While preceding examples have, in various locations, usually used Pos-SRS and/or mimo-SRS by way of example, it is expressly contemplated that other UL positioning signals than Pos-SRS and/or other UL non-positioning signals than mimo-SRS may be similarly applied corresponding to such examples. It is further contemplated that the examples above could combine the use of multiple UL positioning signals and/or multiple UL non-positioning signals.

It is also contemplated that the use of UL non-positioning signals for positioning purposes may be either combined with or used independently of the use of DL non-positioning signals for UE positioning purposes (as described above) within a wireless communications system.

Figure 4:
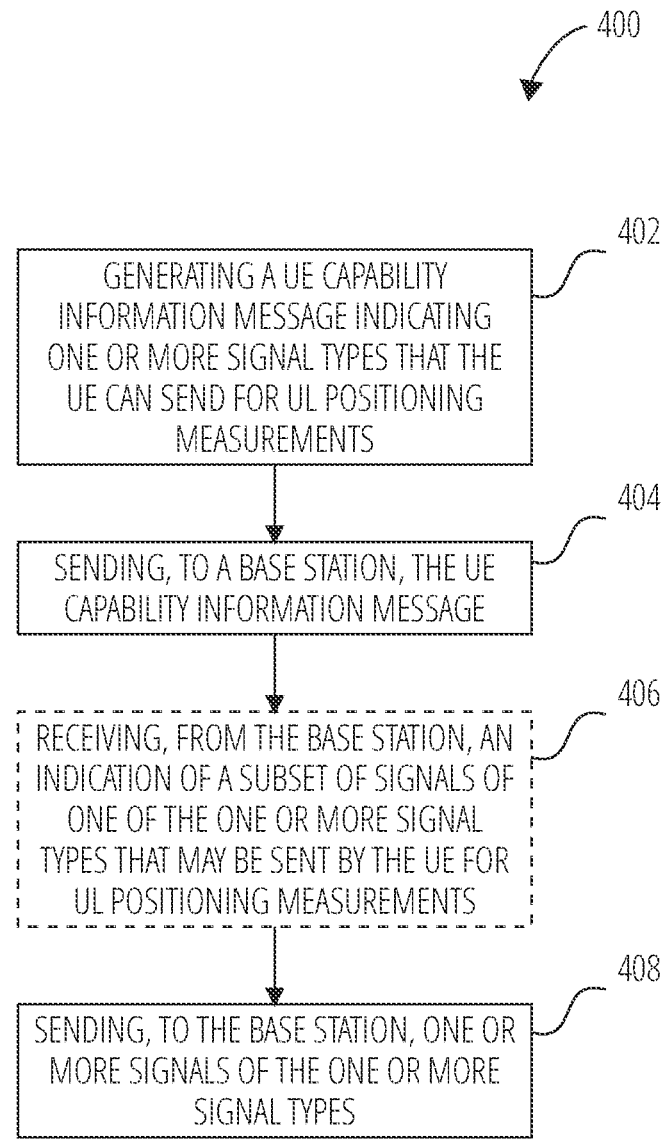
FIG. 4 illustrates a method of a UE, according to an embodiment.

FIG. 4 illustrates a method of a UE, according to an embodiment. The method 400 includes generating 402 a UE capability information message indicating one or more signal types that the UE can send for UL positioning measurements.

The method 400 further includes sending 404, to a base station, the UE capability information message.

The method 400 optionally further includes receiving 406, from the base station, an indication of a subset of signals of one of the one or more signal types that may be sent by the UE for UL positioning measurements.

The method 400 further includes sending 408, to the base station, one or more signals of the one or more signal types.

Figure 5:
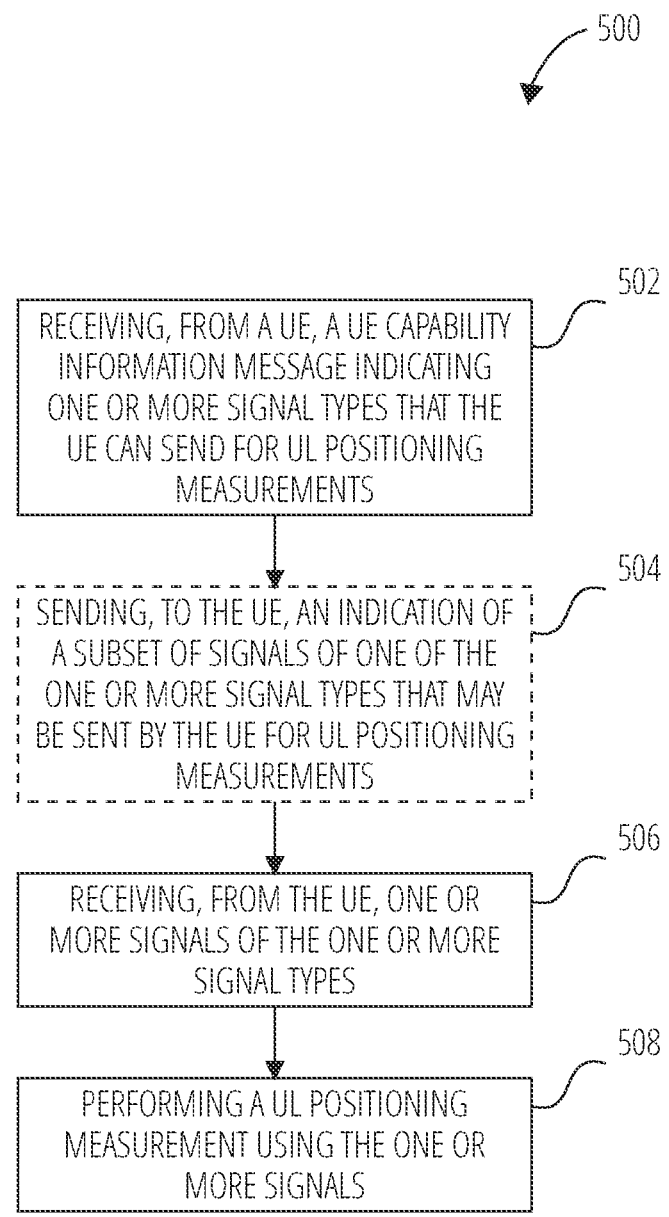
FIG. 5 illustrates a method of a base station, according to an embodiment.

FIG. 5 illustrates a method of a base station, according to an embodiment. The method 500 includes receiving 502, from a UE, a UE capability information message indicating one or more signal types that the UE can send for UL positioning measurements.

The method 500 further includes sending 504, to the UE, an indication of a subset of signals of one of the one or more signal types that may be sent by the UE for UL positioning measurements.

The method 500 further includes receiving 506, from the UE, one or more signals of the one or more signal types.

The method 500 further includes performing 508 a UL positioning measurement using the one or more signals.

Figure 6:
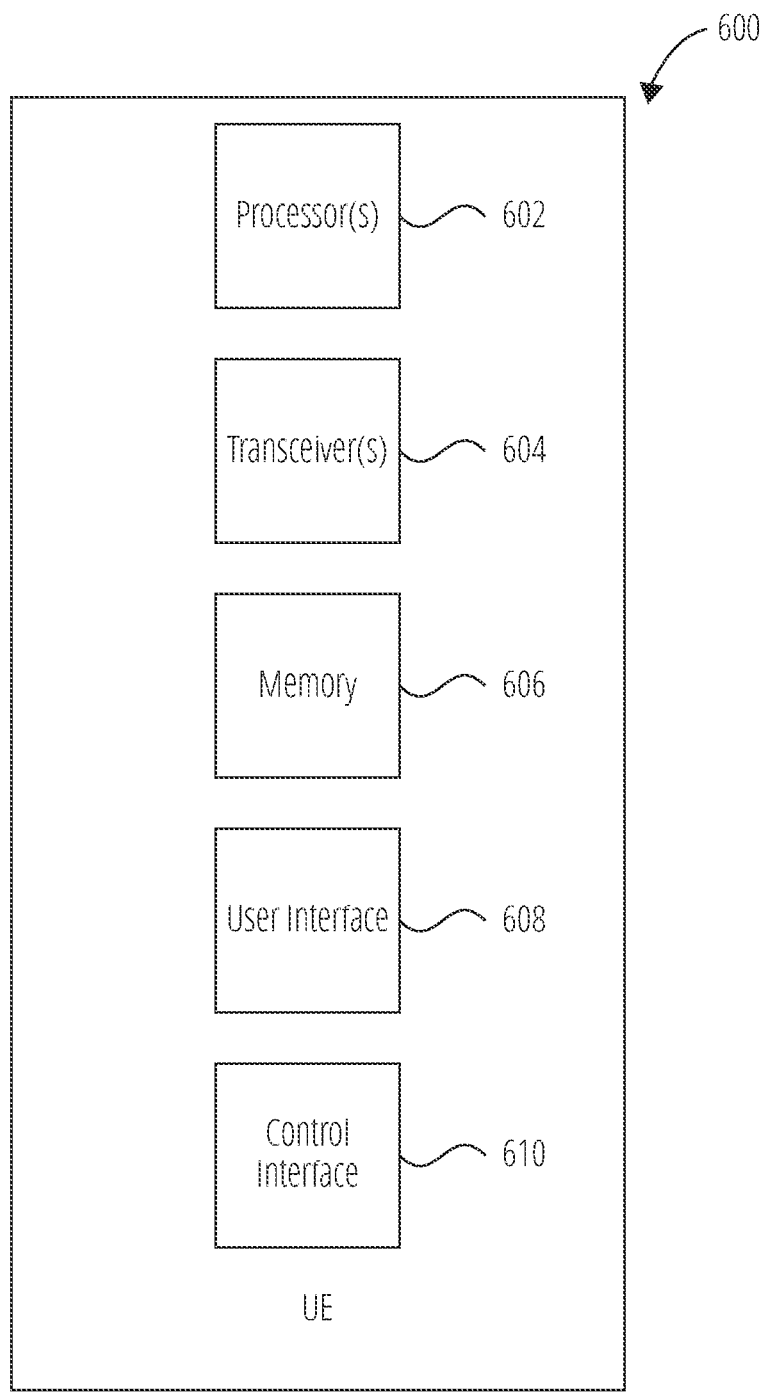
FIG. 6 illustrates a UE in accordance with one embodiment.

FIG. 6 is a block diagram of an example UE 600 configurable according to various embodiments of the present disclosure, including by execution of instructions on a computer-readable medium that correspond to any of the example methods and/or procedures described herein. The UE 600 comprises one or more processor 602, transceiver 604, memory 606, user interface 608, and control interface 610.

The one or more processor 602 may include, for example, an application processor, an audio digital signal processor, a central processing unit, and/or one or more baseband processors. Each of the one or more processor 602 may include internal memory and/or may include interface(s) to communication with external memory (including the memory 606). The internal or external memory can store software code, programs, and/or instructions for execution by the one or more processor 602 to configure and/or facilitate the UE 600 to perform various operations, including operations described herein. For example, execution of the instructions can configure the UE 600 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 604, user interface 608, and/or control interface 610. As another example, the one or more processor 602 may execute program code stored in the memory 606 or other memory that corresponds to MAC, RLC, PDCP, and RRC layer protocols standardized by 3GPP (e.g., for NR and/or LTE). As a further example, the processor 602 may execute program code stored in the memory 606 or other memory that, together with the one or more transceiver 604, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 606 may comprise memory area for the one or more processor 602 to store variables used in protocols, configuration, control, and other functions of the UE 600, including operations corresponding to, or comprising, any of the example methods and/or procedures described herein. Moreover, the memory 606 may comprise non-volatile memory (e.g., flash memory), volatile memory (e.g., static or dynamic RAM), or a combination thereof. Furthermore, the memory 606 may interface with a memory slot by which removable memory cards in one or more formats (e.g., SD Card, Memory Stick, Compact Flash, etc.) can be inserted and removed.

The one or more transceiver 604 may include radio-frequency transmitter and/or receiver circuitry that facilitates the UE 600 to communicate with other equipment supporting like wireless communication standards and/or protocols. For example, the one or more transceiver 604 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 602. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 604 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 602 to implement a PHY layer based on OFDM, OFDMA, and/or SC-FDMA technologies, such as described herein with respect to other figures.

The user interface 608 may take various forms depending on particular embodiments, or can be absent from the UE 600. In some embodiments, the user interface 608 includes a microphone, a loudspeaker, slidable buttons, depressible buttons, a display, a touch screen display, a mechanical or virtual keypad, a mechanical or virtual keyboard, and/or any other user-interface features commonly found on mobile phones. In other embodiments, the UE 600 may comprise a tablet computing device including a larger touchscreen display. In such embodiments, one or more of the mechanical features of the user interface 608 may be replaced by comparable or functionally equivalent virtual user interface features (e.g., virtual keypad, virtual buttons, etc.) implemented using the touchscreen display, as familiar to persons of ordinary skill in the art. In other embodiments, the UE 600 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 600 having a touch screen display are capable of receiving user inputs, such as inputs related to exemplary methods and/or procedures described herein or otherwise known to persons of ordinary skill in the art.

In some exemplary embodiments of the present disclosure, the UE 600 may include an orientation sensor, which can be used in various ways by features and functions of the UE 600. For example, the UE 600 can use outputs of the orientation sensor to determine when a user has changed the physical orientation of the UE 600's touch screen display. An indication signal from the orientation sensor can be available to any application program executing on the UE 600, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 610 may take various forms depending on particular embodiments. For example, the control interface 610 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 610 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 600 may include more functionality than is shown in FIG. 6 including, for example, a video and/or still-image camera, microphone, media player and/or recorder, etc. Moreover, the one or more transceiver 604 may include circuitry for communication using additional radio-frequency communication standards including Bluetooth, GPS, and/or others. Moreover, the one or more processor 602 may execute software code stored in the memory 606 to control such additional functionality. For example, directional velocity and/or position estimates output from a GPS receiver can be available to any application program executing on the UE 600, including various exemplary methods and/or computer-readable media according to various exemplary embodiments of the present disclosure.

Figure 7:
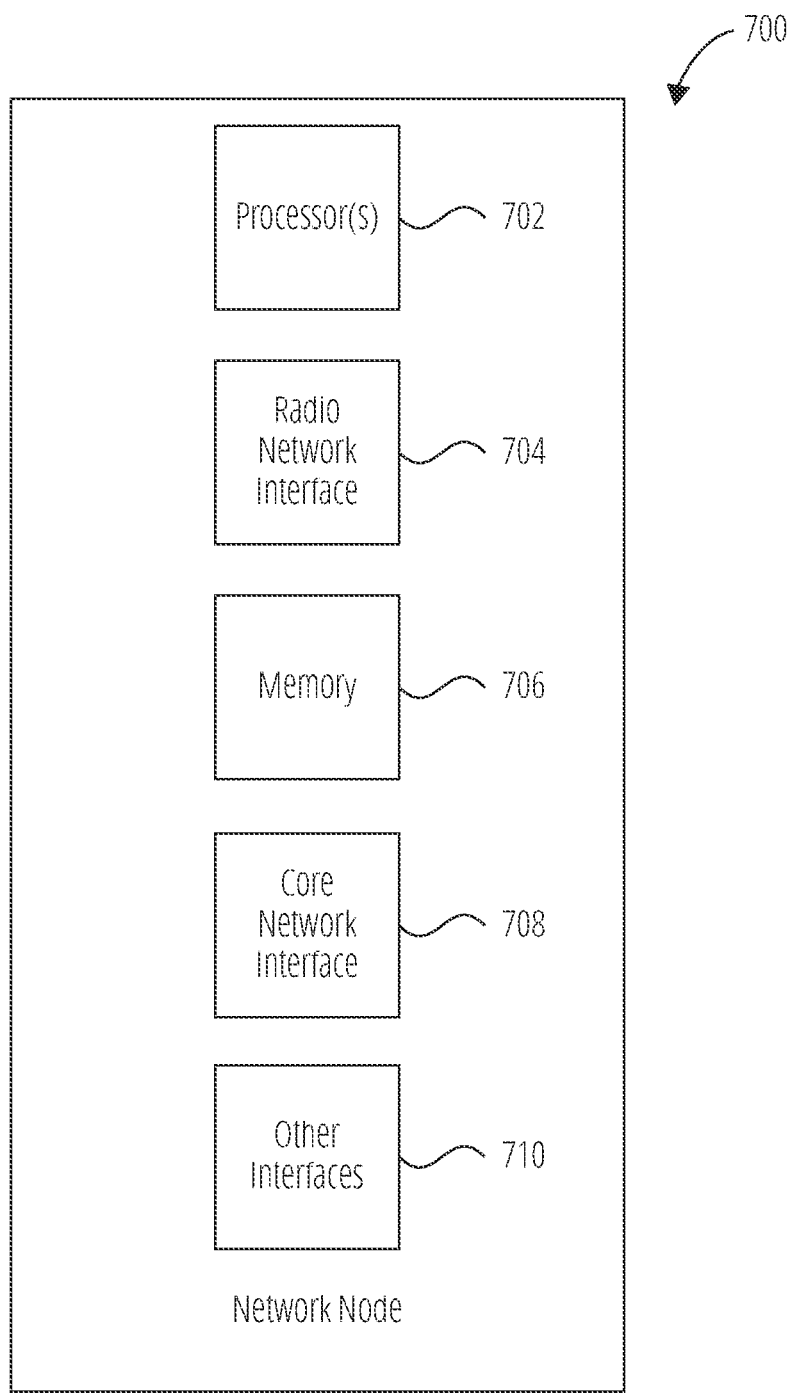
FIG. 7 illustrates a network node in accordance with one embodiment.

FIG. 7 is a block diagram of an example network node 700 configurable according to various embodiments of the present disclosure, including by execution of instructions on a computer-readable medium that correspond to any of the example methods and/or procedures described herein.

The network node 700 includes a one or more processor 702, a radio network interface 704, a memory 706, a core network interface 708, and other interfaces 710. The network node 700 may comprise, for example, a base station, eNB, gNB, access node, or component thereof.

The one or more processor 702 may include any type of processor or processing circuitry and may be configured to perform an of the methods or procedures disclosed herein. The memory 706 may store software code, programs, and/or instructions executed by the one or more processor 702 to configure the network node 700 to perform various operations, including operations described herein. For example, execution of such stored instructions can configure the network node 700 to communicate with one or more other devices using protocols according to various embodiments of the present disclosure, including one or more methods and/or procedures discussed above. Furthermore, execution of such stored instructions can also configure and/or facilitate the network node 700 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 704 and the core network interface 708. By way of example and without limitation, the core network interface 708 comprise an S1 interface and the radio network interface 704 may comprise a Uu interface, as standardized by 3GPP. The memory 706 may also store variables used in protocols, configuration, control, and other functions of the network node 700. As such, the memory 706 may comprise non-volatile memory (e.g., flash memory, hard disk, etc.), volatile memory (e.g., static or dynamic RAM), network-based (e.g., "cloud") storage, or a combination thereof.

The radio network interface 704 may include transmitters, receivers, signal processors, ASICs, antennas, beamforming units, and other circuitry that enables network node 700 to communicate with other equipment such as, in some embodiments, a plurality of compatible user equipment (UE). In some embodiments, the network node 700 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 704 may include a PHY layer based on OFDM, OFDMA, and/or SC-FDMA technologies. In some embodiments, the functionality of such a PHY layer can be provided cooperatively by the radio network interface 704 and the one or more processor 702.

The core network interface 708 may include transmitters, receivers, and other circuitry that enables the network node 700 to communicate with other equipment in a core network such as, in some embodiments, circuit-switched (CS) and/or packet-switched Core (PS) networks. In some embodiments, the core network interface 708 may include the S1 interface standardized by 3GPP. In some embodiments, the core network interface 708 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 708 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 710 may include transmitters, receivers, and other circuitry that enables the network node 700 to communicate with external networks, computers, databases, and the like for purposes of operations, administration, and maintenance of the network node 700 or other network equipment operably connected thereto.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 8:
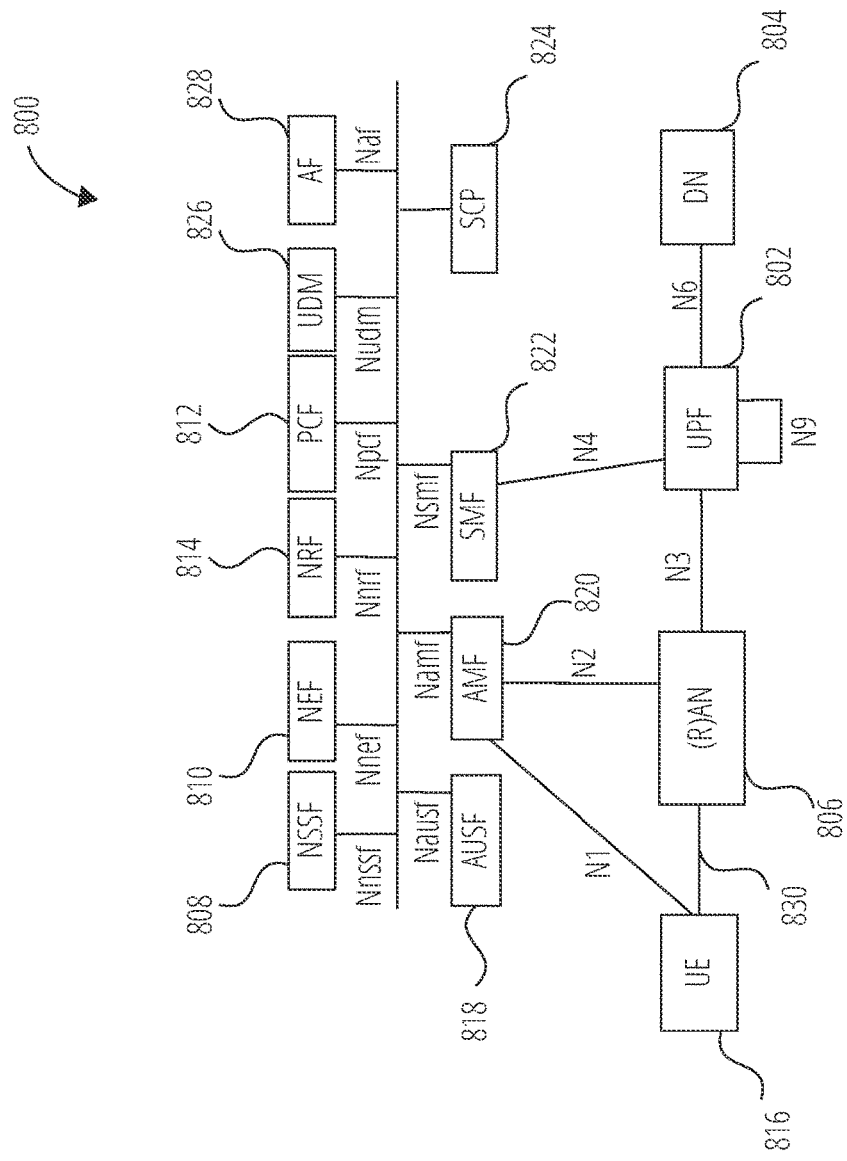
FIG. 8 illustrates an example service based architecture in accordance with certain embodiments.

FIG. 8 illustrates a service based architecture 800 in 5GS according to one embodiment. As described in 3GPP TS 23.501, the service based architecture 800 comprises NFs such as an NSSF 808, a NEF 810, an NRF 814, a PCF 812, a UDM 826, an AUSF 818, an AMF 820, an SMF 822, for communication with a UE 816, a (R)AN 806, a UPF 802, and a DN 804. The NFs and NF services can communicate directly, referred to as Direct Communication, or indirectly via a SCP 824, referred to as Indirect Communication. FIG. 8 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 8 are described below.

The NSSF 808 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 810 supports exposure of capabilities and events. NF capabilities and events may be securely exposed by the NEF 810 (e.g., for 3rd party, Application Functions, and/or Edge Computing). The NEF 810 may store/retrieve information as structured data using a standardized interface (Nudr) to a UDR. The NEF 810 may also secure provision of information from an external application to 3GPP network and may provide for the Application Functions to securely provide information to the 3GPP network (e.g., expected UE behavior, group information, and service specific information), wherein the NEF 810 may authenticate and authorize and assist in throttling the Application Functions. The NEF 810 may provide translation of internal-external information by translating between information exchanged with the AF 828 and information exchanged with the internal network function. For example, the NEF 810 translates between an AF-Service-Identifier and internal 5G Core information such as DNN and S-NSSAI. The NEF 810 may handle masking of network and user sensitive information to external AF's according to the network policy. The NEF 810 may receive information from other network functions (based on exposed capabilities of other network functions), and stores the received information as structured data using a standardized interface to a UDR. The stored information can be accessed and re-exposed by the NEF 810 to other network functions and Application Functions, and used for other purposes such as analytics. For external exposure of services related to specific UE(s), the NEF 810 may reside in the HPLMN. Depending on operator agreements, the NEF 810 in the HPLMN may have interface(s) with NF(s) in the VPLMN. When a UE is capable of switching between EPC and 5GC, an SCEF+NEF may be used for service exposure.

The NRF 814 supports service discovery function by receiving an NF Discovery Request from an NF instance or SCP and providing the information of the discovered NF instances to the NF instance or SCP. The NRF 814 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 812 supports a unified policy framework to govern network behavior. The PCF 812 provides policy rules to Control Plane function(s) to enforce them. The PCF 812 accesses subscription information relevant for policy decisions in a Unified Data Repository (UDR). The PCF 812 may access the UDR located in the same PLMN as the PCF.

The UDM 826 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 826 uses subscription data (including authentication data) that may be stored in a UDR, in which case a UDM implements the application logic and may not require an internal user data storage and several different UDMs may serve the same user in different transactions. The UDM 826 may be located in the HPLMN of the subscribers it serves, and may access the information of the UDR located in the same PLMN.

The AUSF 818 supports authentication for 3GPP access and untrusted non-3GPP access. The AUSF 818 may also provide support for Network Slice-Specific Authentication and Authorization.

The AMF 820 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 820. Regardless of the number of Network functions, in certain embodiments there is only one NAS interface instance per access network between the UE and the CN, terminated at one of the Network functions that implements at least NAS security and Mobility Management. The AMF 820 may also include policy related functionalities.

In addition to the functionalities described above, the AMF 820 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a co-ordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 822 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 822 may include policy related functionalities.

The SCP 824 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 824 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 816 may include a device with radio communication capabilities. For example, the UE 816 may comprise a smartphone (e.g., handheld touchscreen mobile computing devices connectable to one or more cellular networks). The UE 816 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 816 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 816 may be configured to connect or communicatively couple with the (R)AN 806 through a radio interface 830, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 816 and the (R)AN 806 may use a Uu interface (e.g., an LTE-Uu interface) to exchange control plane data via a protocol stack comprising a PHY layer, an MAC layer, an RLC layer, a PDCP layer, and an RRC layer. A DL transmission may be from the (R)AN 806 to the UE 816 and a UL transmission may be from the UE 816 to the (R)AN 806. The UE 816 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 806 can include one or more access nodes, which may be referred to as base stations (BS s), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 806 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 806) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 816 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 802 may act as an anchor point for intra-RAT and inter-RAT mobility, an external PDU session point of interconnect to the DN 804, and a branching point to support multi-homed PDU session. The UPF 802 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 802 may include an uplink classifier to support routing traffic flows to a data network. The DN 804 may represent various network operator services, Internet access, or third party services. The DN 804 may include, for example, an application server.

Figure 9:
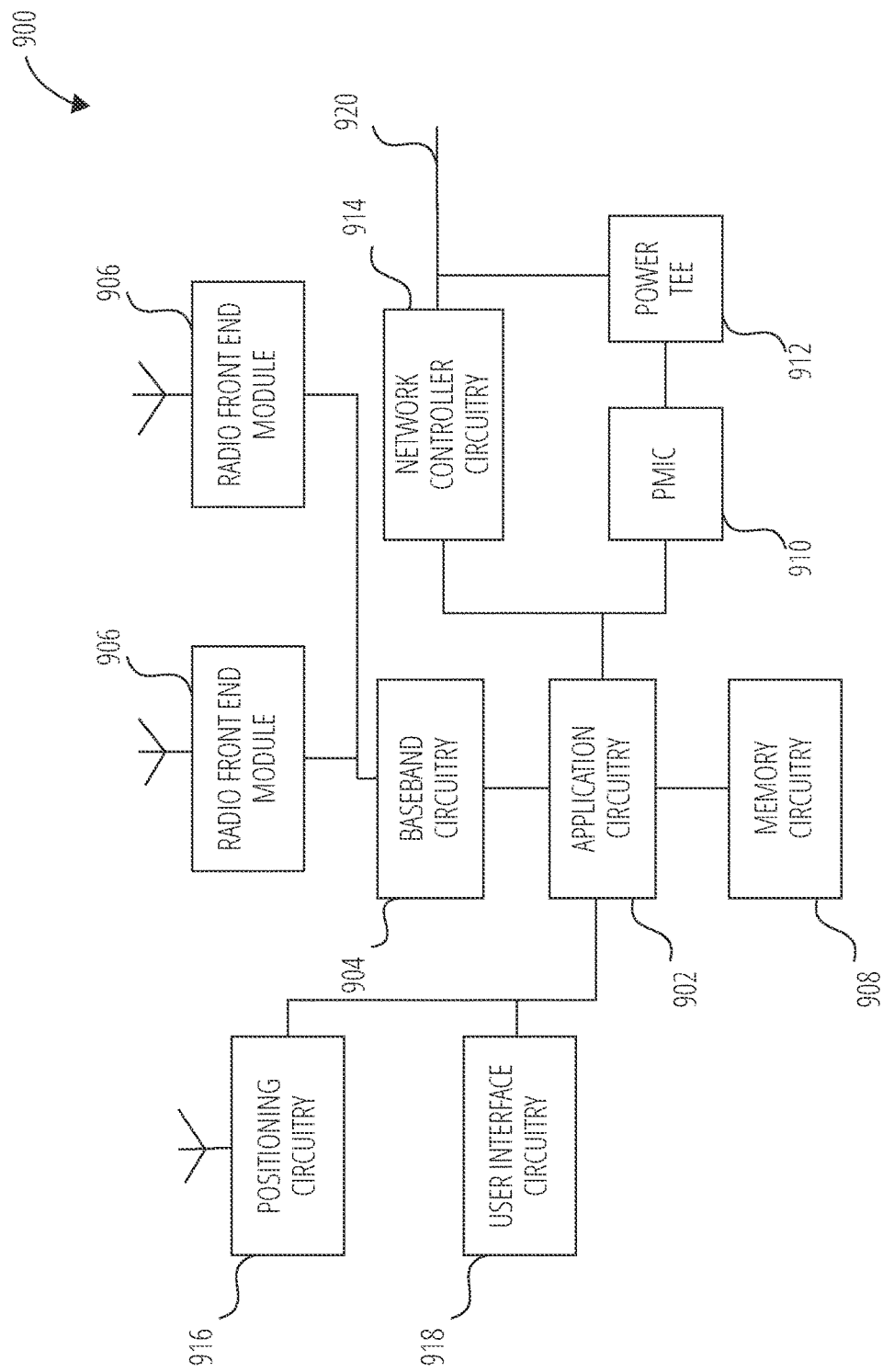
FIG. 9 illustrates an infrastructure equipment in accordance with one embodiment.

FIG. 9 illustrates an example of infrastructure equipment 900 in accordance with various embodiments. The infrastructure equipment 900 may be implemented as a base station, radio head, RAN node, AN, application server, and/or any other element/device discussed herein. In other examples, the infrastructure equipment 900 could be implemented in or by a UE.

The infrastructure equipment 900 includes application circuitry 902, baseband circuitry 904, one or more radio front end module 906 (RFEM), memory circuitry 908, power management integrated circuitry (shown as PMIC 910), power tee circuitry 912, network controller circuitry 914, network interface connector 920, satellite positioning circuitry 916, and user interface circuitry 918. In some embodiments, the device infrastructure equipment 900 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 902 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 902 may be coupled with or may include memory/storage elements and may be configured to execute instructions stored in the memory/storage to enable various applications or operating systems to run on the infrastructure equipment 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 902 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 902 may comprise, or may be, a special-purpose processor/controller to operate according to the various embodiments herein. As examples, the processor(s) of application circuitry 902 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 900 may not utilize application circuitry 902, and instead may include a special-purpose processor/controller to process IP data received from an EPC or 5GC, for example.

In some implementations, the application circuitry 902 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 902 may comprise logic blocks or logic fabric, and other interconnected resources that may be programmed to perform various functions, such as the procedures, methods, functions, etc. of the various embodiments discussed herein. In such embodiments, the circuitry of application circuitry 902 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 904 may be implemented, for example, as a solder-down substrate including one or more integrated circuits, a single packaged integrated circuit soldered to a main circuit board or a multi-chip module containing two or more integrated circuits.

The user interface circuitry 918 may include one or more user interfaces designed to enable user interaction with the infrastructure equipment 900 or peripheral component interfaces designed to enable peripheral component interaction with the infrastructure equipment 900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 906 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 906, which incorporates both mmWave antennas and sub-mmWave.

The memory circuitry 908 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 908 may be implemented as one or more of solder down packaged integrated circuits, socketed memory modules and plug-in memory cards.

The PMIC 910 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 912 may provide for electrical power drawn from a network cable to provide both power supply and data connectivity to the infrastructure equipment 900 using a single cable.

The network controller circuitry 914 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 900 via network interface connector 920 using a physical connection, which may be electrical (commonly referred to as a "copper interconnect"), optical, or wireless. The network controller circuitry 914 may include one or more dedicated processors and/or FPGAs to communicate using one or more of the aforementioned protocols. In some implementations, the network controller circuitry 914 may include multiple controllers to provide connectivity to other networks using the same or different protocols.

The positioning circuitry 916 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 916 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 916 may include a Micro-Technology for Positioning, Navigation, and Timing (Micro-PNT) IC that uses a master timing clock to perform position tracking/estimation without GNSS assistance. The positioning circuitry 916 may also be part of, or interact with, the baseband circuitry 904 and/or radio front end module 906 to communicate with the nodes and components of the positioning network. The positioning circuitry 916 may also provide position data and/or time data to the application circuitry 902, which may use the data to synchronize operations with various infrastructure, or the like. The components shown by FIG. 9 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 10:
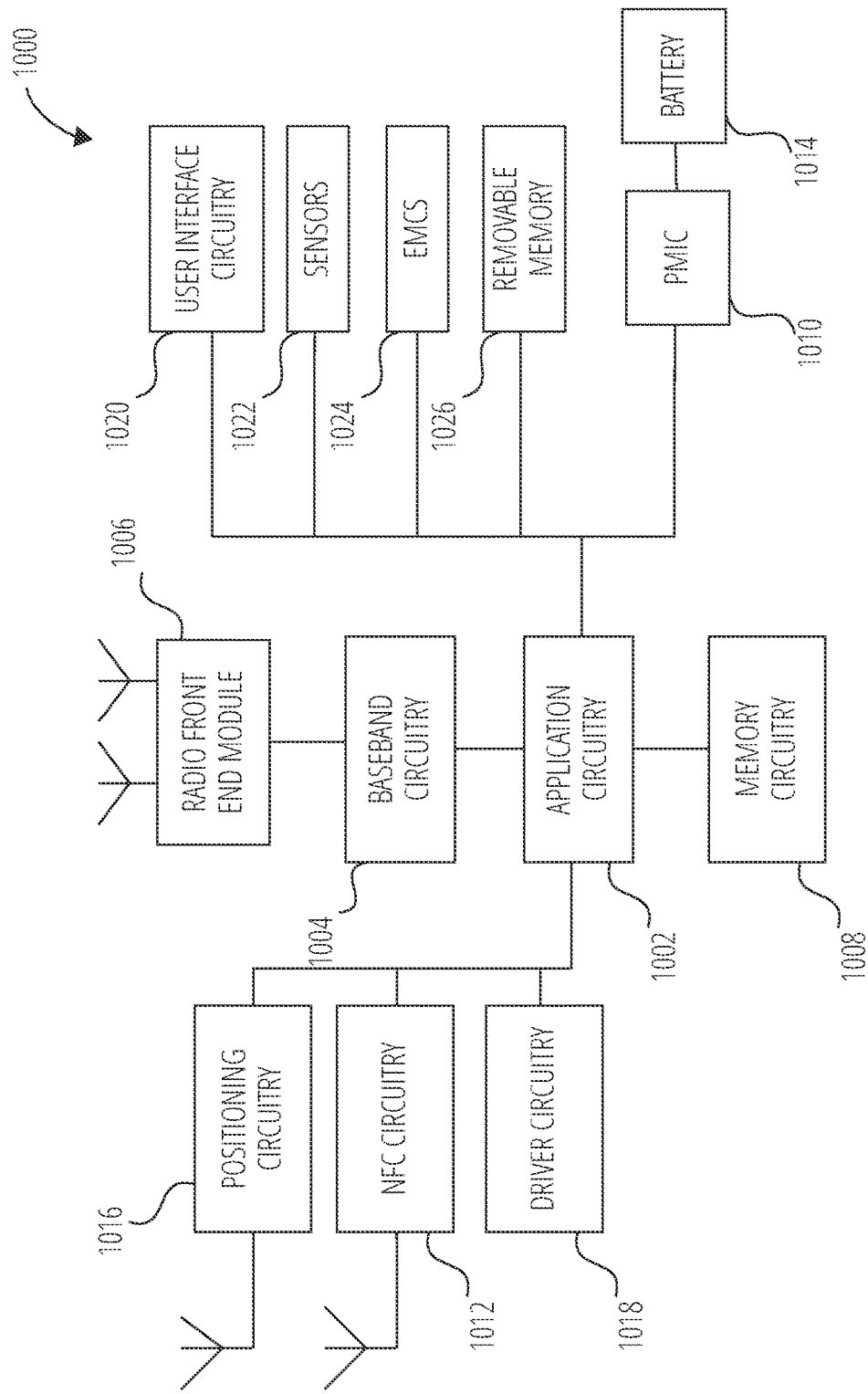
FIG. 10 illustrates a platform in accordance with one embodiment.

FIG. 10 illustrates an example of a platform 1000 in accordance with various embodiments. In embodiments, the computer platform 1000 may be suitable for use as UEs, application servers, and/or any other element/device discussed herein. The platform 1000 may include any combinations of the components shown in the example. The components of platform 1000 may be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The block diagram of FIG. 10 is intended to show a high level view of components of the computer platform 1000. However, some of the components shown may be omitted, additional components may be present, and different arrangement of the components shown may occur in other implementations.

Application circuitry 1002 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose 10, memory card controllers such as SD MMC or similar, USB interfaces, MIPI interfaces, and JTAG test access ports. The processors (or cores) of the application circuitry 1002 may be coupled with or may include memory/storage elements and may be configured to execute instructions stored in the memory/storage to enable various applications or operating systems to run on the platform 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1002 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1002 may comprise, or may be, a special-purpose processor/controller to operate according to the various embodiments herein.

As examples, the processor(s) of application circuitry 1002 may include an Intel® Architecture Core™ based processor, such as a Quark™, an Atom™, an i3, an i5, an i7, or an MCU-class processor, or another such processor available from Intel® Corporation. The processors of the application circuitry 1002 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1002 may be a part of a system on a chip (SoC) in which the application circuitry 1002 and other components are formed into a single integrated circuit, or a single package, such as the Edison™ or Galileo™ SoC boards from Intel® Corporation.

Additionally or alternatively, application circuitry 1002 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1002 may comprise logic blocks or logic fabric, and other interconnected resources that may be programmed to perform various functions, such as the procedures, methods, functions, etc. of the various embodiments discussed herein. In such embodiments, the circuitry of application circuitry 1002 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1004 may be implemented, for example, as a solder-down substrate including one or more integrated circuits, a single packaged integrated circuit soldered to a main circuit board or a multi-chip module containing two or more integrated circuits.

The radio front end module 1006 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1006, which incorporates both mmWave antennas and sub-mmWave.

The memory circuitry 1008 may include any number and type of memory devices used to provide for a given amount of system memory. As examples, the memory circuitry 1008 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1008 may be developed in accordance with a Joint Electron Devices Engineering Council (JEDEC) low power double data rate (LPDDR)-based design, such as LPDDR2, LPDDR3, LPDDR4, or the like. Memory circuitry 1008 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1008 maybe on-die memory or registers associated with the application circuitry 1002. To provide for persistent storage of information such as data, applications, operating systems and so forth, memory circuitry 1008 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1000 may incorporate the three-dimensional (3D) cross-point (XPOINT) memories from Intel® and Micron®.

The removable memory 1026 may include devices, circuitry, enclosures/housings, ports or receptacles, etc. used to couple portable data storage devices with the platform 1000. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1000 may also include interface circuitry (not shown) that is used to connect external devices with the platform 1000. The external devices connected to the platform 1000 via the interface circuitry include sensors 1022 and electro-mechanical components (shown as EMCs 1024), as well as removable memory devices coupled to removable memory 1026.

The sensors 1022 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1024 include devices, modules, or subsystems whose purpose is to enable platform 1000 to change its state, position, and/or orientation, or move or control a mechanism or (sub)system. Additionally, EMCs 1024 may be configured to generate and send messages/signaling to other components of the platform 1000 to indicate a current state of the EMCs 1024. Examples of the EMCs 1024 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1000 is configured to operate one or more EMCs 1024 based on one or more captured events and/or instructions or control signals received from a service provider and/or various clients. In some implementations, the interface circuitry may connect the platform 1000 with positioning circuitry 1016. The positioning circuitry 1016 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1016 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1016 may include a Micro-PNT IC that uses a master timing clock to perform position tracking/estimation without GNSS assistance. The positioning circuitry 1016 may also be part of, or interact with, the baseband circuitry 1004 and/or radio front end module 1006 to communicate with the nodes and components of the positioning network. The positioning circuitry 1016 may also provide position data and/or time data to the application circuitry 1002, which may use the data to synchronize operations with various infrastructure (e.g., radio base stations), for turn-by-turn navigation applications, or the like.

In some implementations, the interface circuitry may connect the platform 1000 with Near-Field Communication circuitry (shown as NFC circuitry 1012). The NFC circuitry 1012 is configured to provide contactless, short-range communications based on radio frequency identification (RFID) standards, wherein magnetic field induction is used to enable communication between NFC circuitry 1012 and NFC-enabled devices external to the platform 1000 (e.g., an "NFC touchpoint"). NFC circuitry 1012 comprises an NFC controller coupled with an antenna element and a processor coupled with the NFC controller. The NFC controller may be a chip/IC providing NFC functionalities to the NFC circuitry 1012 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1012, or initiate data transfer between the NFC circuitry 1012 and another active NFC device (e.g., a smartphone or an NFC-enabled POS terminal) that is proximate to the platform 1000.

The driver circuitry 1018 may include software and hardware elements that operate to control particular devices that are embedded in the platform 1000, attached to the platform 1000, or otherwise communicatively coupled with the platform 1000. The driver circuitry 1018 may include individual drivers allowing other components of the platform 1000 to interact with or control various input/output (I/O) devices that may be present within, or connected to, the platform 1000. For example, driver circuitry 1018 may include a display driver to control and allow access to a display device, a touchscreen driver to control and allow access to a touchscreen interface of the platform 1000, sensor drivers to obtain sensor readings of sensors 1022 and control and allow access to sensors 1022, EMC drivers to obtain actuator positions of the EMCs 1024 and/or control and allow access to the EMCs 1024, a camera driver to control and allow access to an embedded image capture device, audio drivers to control and allow access to one or more audio devices.

The power management integrated circuitry (shown as PMIC 1010) (also referred to as "power management circuitry") may manage power provided to various components of the platform 1000. In particular, with respect to the baseband circuitry 1004, the PMIC 1010 may control power-source selection, voltage scaling, battery charging, or DC-to-DC conversion. The PMIC 1010 may often be included when the platform 1000 is capable of being powered by a battery 1014, for example, when the device is included in a UE.

In some embodiments, the PMIC 1010 may control, or otherwise be part of, various power saving mechanisms of the platform 1000. For example, if the platform 1000 is in an RRC_Connected state, where it is still connected to the RAN node as it expects to receive traffic shortly, then it may enter a state known as Discontinuous Reception Mode (DRX) after a period of inactivity. During this state, the platform 1000 may power down for brief intervals of time and thus save power. If there is no data traffic activity for an extended period of time, then the platform 1000 may transition off to an RRC_Idle state, where it disconnects from the network and does not perform operations such as channel quality feedback, handover, etc. The platform 1000 goes into a very low power state and it performs paging where again it periodically wakes up to listen to the network and then powers down again. The platform 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1014 may power the platform 1000, although in some examples the platform 1000 may be mounted deployed in a fixed location, and may have a power supply coupled to an electrical grid. The battery 1014 may be a lithium ion battery, a metal-air battery, such as a zinc-air battery, an aluminum-air battery, a lithium-air battery, and the like. In some implementations, such as in V2X applications, the battery 1014 may be a typical lead-acid automotive battery.

In some implementations, the battery 1014 may be a "smart battery," which includes or is coupled with a Battery Management System (BMS) or battery monitoring integrated circuitry. The BMS may be included in the platform 1000 to track the state of charge (SoCh) of the battery 1014. The BMS may be used to monitor other parameters of the battery 1014 to provide failure predictions, such as the state of health (SoH) and the state of function (SoF) of the battery 1014. The BMS may communicate the information of the battery 1014 to the application circuitry 1002 or other components of the platform 1000. The BMS may also include an analog-to-digital (ADC) convertor that allows the application circuitry 1002 to directly monitor the voltage of the battery 1014 or the current flow from the battery 1014.

The battery parameters may be used to determine actions that the platform 1000 may perform, such as transmission frequency, network operation, sensing frequency, and the like.

A power block, or other power supply coupled to an electrical grid may be coupled with the BMS to charge the battery 1014. In some examples, the power block may be replaced with a wireless power receiver to obtain the power wirelessly, for example, through a loop antenna in the computer platform 1000. In these examples, a wireless battery charging circuit may be included in the BMS. The specific charging circuits chosen may depend on the size of the battery 1014, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1020 includes various input/output (I/O) devices present within, or connected to, the platform 1000, and includes one or more user interfaces designed to enable user interaction with the platform 1000 and/or peripheral component interfaces designed to enable peripheral component interaction with the platform 1000. The user interface circuitry 1020 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1000. The output device circuitry may also include speakers or other audio emitting devices, printer(s), and/or the like. In some embodiments, the sensors 1022 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1000 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 11:
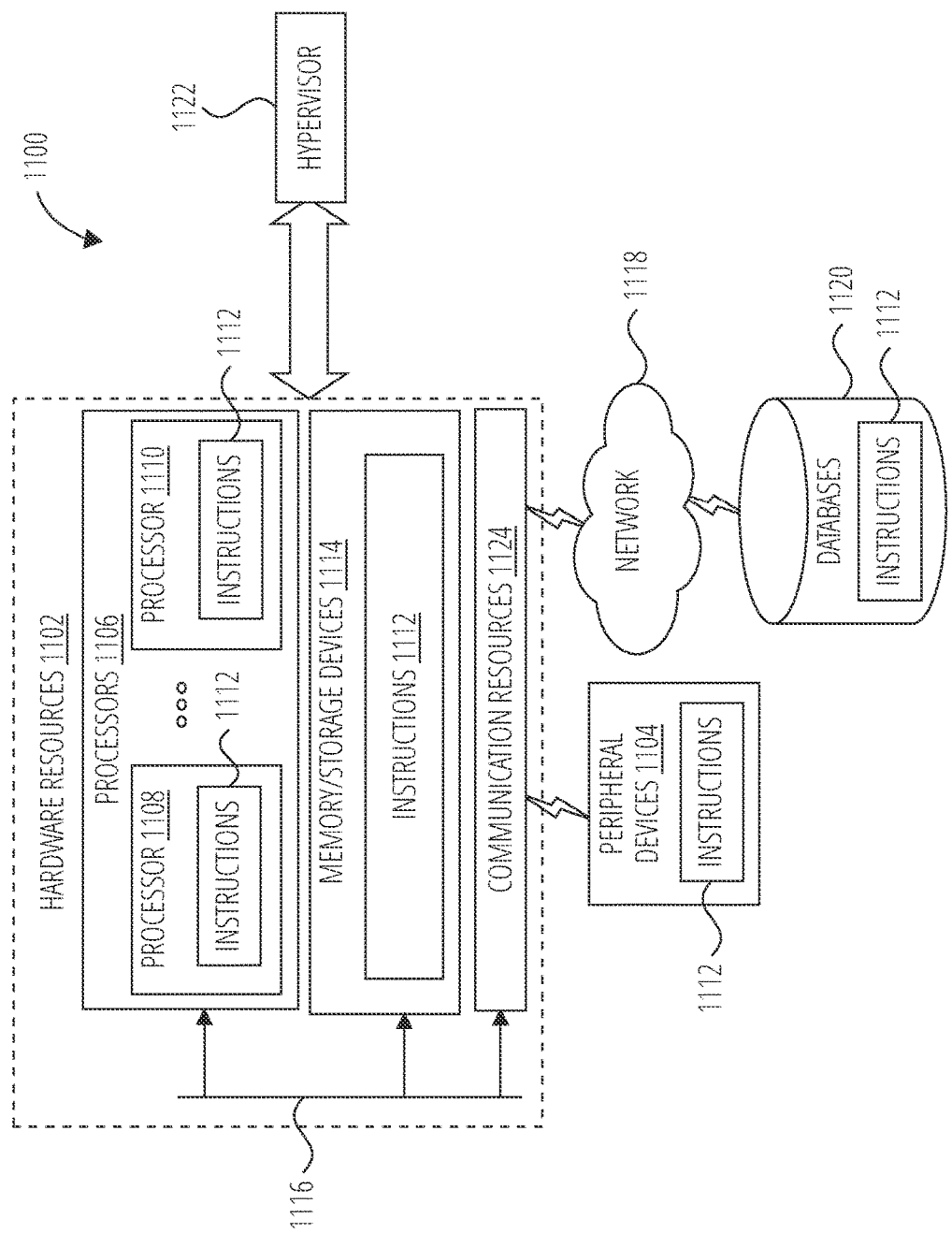
FIG. 11 illustrates components in accordance with one embodiment.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1106 (or processor cores), one or more memory/storage devices 1114, and one or more communication resources 1124, each of which may be communicatively coupled via a bus 1116. For embodiments where node virtualization (e.g., NFV) is utilized, a hypervisor 1122 may be executed to provide an execution environment for one or more network slices/sub-slices to utilize the hardware resources 1102.

The processors 1106 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1108 and a processor 1110.

The memory/storage devices 1114 may include main memory, disk storage, or any suitable combination thereof. The memory/storage devices 1114 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1124 may include interconnection or network interface components or other suitable devices to communicate with one or more peripheral devices 1104 or one or more databases 1120 via a network 1118. For example, the communication resources 1124 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1112 may comprise software, a program, an application, an app let, an app, or other executable code for causing at least any of the processors 1106 to perform any one or more of the methodologies discussed herein. The instructions 1112 may reside, completely or partially, within at least one of the processors 1106 (e.g., within the processor's cache memory), the memory/storage devices 1114, or any suitable combination thereof. Furthermore, any portion of the instructions 1112 may be transferred to the hardware resources 1102 from any combination of the peripheral devices 1104 or the databases 1120. Accordingly, the memory of the processors 1106, the memory/storage devices 1114, the peripheral devices 1104, and the databases 1120 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 may include a method of a user equipment (UE), comprising: generating a UE capability information message indicating one or more signal types that the UE can process for downlink (DL) positioning measurements; sending, to a base station, the UE capability information message; receiving, from the base station, one or more signals of the one or more signal types; and performing a DL positioning measurement using the one or more signals.

Example 2 may include the method of Example 1, wherein the DL positioning measurement is performed by the UE as part of one of an observed time difference of arrival (OTDOA) positioning method, an enhanced cell-ID (EID) positioning method, a DL angle of departure (DL-AoD) positioning method, a DL-time difference of arrival (DL-TDOA) positioning method, and a multi-round trip time (Multi-RTT) positioning method.

Example 3 may include the method of any of Examples 1 and 2, wherein the one or more signal types comprises one of synchronization signal block (SSB), primary synchronization signal (PSS), secondary synchronization signal (SSS) and physical broadcast channel (PBCH).

Example 4 may include the method of Example 3, further comprising receiving, from the base station, an indication of a subset of SSBs sent by the base station that may be processed at the UE for DL positioning measurements.

Example 5 may include the method of any of Examples 1 and 2, wherein the one or more signal types comprises demodulation reference signal (DMRS).

Example 6 may include the method of any of Examples 1 and 2, wherein the one or more signal types comprises channel state information reference signal (CSI-RS).

Example 7 may include the method of any of Examples 1 and 2, wherein the one or more signal types comprises tracking reference signal (TRS).

Example 8 may include the method of any of Examples 1 through 7, wherein the UE capability information message further indicates that signals of each of at least two signal types can be processed by the UE for DL positioning measurements when received in one of a same time resource, a same frequency resource, and a same time and frequency resource, the at least two signal types comprising at least one of the indicated one or more signal types.

Example 9 may include the method of Example 8, wherein the UE capability information message further indicates a maximum supported number of signals of the at least two signal types that can be processed by the UE for DL positioning measurements when received in the one of the same time resource, the same frequency resource, and the same time and frequency resource.

Example 10 may include the method of Example 9, wherein the UE capability information message further indicates an upper timing limitation on the signals of the at least two signal types that can be processed by the UE for DL positioning measurements when received in the one of the same time resource, the same frequency resource, and the same time and frequency resource.

Example 11 may include the method of Example 9, wherein the UE capability information message further indicates a band for which the indication of the maximum supported number of the signals of the at least two signal types that can be processed by the UE for DL positioning measurements when received in the one of the same time resource, the same frequency resource, and the same time and frequency resource applies.

Example 12 may include the method of Example 8, wherein the UE capability information message further indicates a maximum supported number of signals of a first of the at least two signal types that can be processed by the UE for DL positioning measurements when received in the one of the same time resource, the same frequency resource, and the same time and frequency resource.

Example 13 may include the method of Example 12, wherein the UE capability information message further indicates a maximum supported number of signals of a second of the at least two signal types that can be processed by the UE for DL positioning measurements when received in the one of the same time resource, the same frequency resource, and the same time and frequency resource.

Example 14 may include method of a base station, comprising: receiving, from a user equipment (UE), a UE capability information message indicating one or more signal types that the UE can process for downlink (DL) positioning measurements; and sending, to the UE, one or more signals of the one or more signal types.

Example 15 may include the method of Example 14, further comprising cancelling a transmission of a DL positioning signal to the UE in response to receiving the UE capability information message.

Example 16 may include the method of any of Examples 14 and 15, wherein the one or more signal types comprises one of synchronization signal block (SSB), primary synchronization signal (PSS), secondary synchronization signal (PSS), and physical broadcast channel (PBCH).

Example 17 may include the method of Example 16, further comprising sending, to the UE, an indication of a subset of SSBs sent by the base station that may be processed at the UE for DL positioning measurements.

Example 18 may include the method of any of Examples 14 and 15, wherein the one or more signal types comprises demodulation reference signal (DMRS).

Example 19 may include the method of any of Examples 14 and 15, wherein the one or more signal types comprises channel state information reference signal (CSI-RS).

Example 20 may include the method of any of Examples 14 and 15, wherein the one or more signal types comprises tracking reference signal (TRS).

Example 21 may include the method of any of Examples 14 through 20, wherein: the UE capability information message further indicates that signals of each of at least two signal types can be processed by the UE for DL positioning measurements when received in one of a same time resource, a same frequency resource, and a same time and frequency resource, the at least two signal types comprising at least one of the indicated one or more signal types; and the sending, to the UE, the one or more signals of the one or more signal types comprises sending at least one signal of each of the at least two signal types to the UE in the one of the same time resource, the same frequency resource, and the same time and frequency resource.

Example 22 may include the method of Example 21, wherein the UE capability information message further indicates a maximum supported number of signals of the at least two signal types that can be processed by the UE for DL positioning measurements when received in the one of the same time resource, the same frequency resource, and the same time and frequency resource.

Example 23 may include the method of Example 22, wherein the UE capability information message further indicates an upper timing limitation on the signals of the at least two signal types that can be processed by the UE for DL positioning measurements when received in the one of the same time resource, the same frequency resource, and the same time and frequency resource.

Example 24 may include the method of Example 22, wherein the UE capability information message further indicates a band for which the indication of the maximum supported number of signals of the at least two signal types that can be processed by the UE for DL positioning measurements when received in the one of the same time resource, the same frequency resource, and the same time and frequency resource applies.

Example 25 may include the method of Example 21, wherein the UE capability information message further indicates a maximum supported number of signals of a first of the at least two signal types that can be processed by the UE for DL positioning measurements when received in the one of the same time resource, the same frequency resource, and the same time and frequency resource.

Example 26 may include the method of Example 25, wherein the UE capability information message further indicates a maximum supported number of signals of a second of the at least two signal types that can be processed by the UE for DL positioning measurements when received in the one of the same time resource, the same frequency resource, and the same time and frequency resource.

Example 27 may include a method of a user equipment (UE), comprising: generating a UE capability information message indicating one or more signal types that the UE can send for uplink (UL) positioning measurements; sending, to a base station, the UE capability information message; and sending, to the base station, one or more signals of the one or more signal types.

Example 28 may include the method of Example 27, wherein the one or more signal types comprises sounding reference signal for multiple input multiple output (mimo-SRS).

Example 29 may include the method of Example 28, further comprising receiving, from the base station, an indication of a subset of mimo-SRS sent by the UE that may be used for UL positioning measurements.

Example 30 may include the method of Example 27, wherein the one or more signal types comprises physical random access channel (PRACH).

Example 31 may include the method of Example 27, wherein the one or more signal types comprises physical uplink shared channel demodulation reference signal (PUSCH DMRS).

Example 32 may include the method of any of Examples 27 through 31, wherein the UE is configured to send at least one of the one or more signals of the one or more signal types to the base station starting in any symbol of a slot used by the UE to send the at least one of the one or more signals.

Example 33 may include the method of any of Examples 27 through 32, wherein the UE capability information message further indicates that a signal of one of the one or more signal types may be sent by the UE according to one or more of an inter-slot frequency hopping scheme, an intra-slot frequency hopping scheme, and a slot repetition scheme.

Example 34 may include the method of any of Examples 27 through 33, wherein the UE capability information message further indicates that signals of each of at least two signal types can be sent by the UE in one of a same time resource, a same frequency resource, and a same time and frequency resource, the at least two signal types comprising at least one of the indicated one or more signal types.

Example 35 may include the method of Example 34, wherein the UE capability information message further indicates a maximum supported number of signals of the at least two signal types that can be sent by the UE for UL positioning measurements within the one of the same time resource, the same frequency resource, and the same time and frequency resource.

Example 36 may include the method of Example 34, wherein the UE capability information message further indicates, to the base station, a maximum supported number of signals of a first of the at least two signal types that can be sent by the UE for UL positioning measurements within the one of the same time resource, the same frequency resource, and the same time and frequency resource.

Example 37 may include the method of Example 36, wherein the UE capability information further indicates a maximum supported number of signals of a second of the at least two signal types that can be sent by the UE for UL positioning measurements within the one of the same time resource, the same frequency resource, and the same time and frequency resource.

Example 38 may include a method of a base station, comprising: receiving, from a user equipment (UE), a UE capability information message indicating one or more signal types that the UE can send for uplink (UL) positioning measurements; receiving, from the UE, one or more signals of the one or more signal types; and performing a UL positioning measurement using the one or more signals.

Example 39 may include the method of Example 38, wherein the UL positioning measurement is performed by the base station as part of one of an UL angle of arrival (UL-AoA) positioning method, a UL-time difference of arrival (UL-TDOA) positioning method, and a multi-round trip time (Multi-RTT) positioning method.

Example 40 may include the method of any of Examples 38 and 39, wherein the one or more signal types comprises sounding reference signal for multiple input multiple output (mimo-SRS).

Example 41 may include the method of Example 40, further comprising sending, to the UE, an indication of a subset of mimo-SRS sent by the UE that may be used for UL positioning measurements.

Example 42 may include the method of any of Examples 38 and 39, wherein the one or more signal types comprises physical random access channel (PRACH).

Example 43 may include the method of any of Examples 38 and 39, wherein the one or more signal types comprises physical uplink shared channel demodulation reference signal (PUSCH DMRS).

Example 44 may include the method of any of Examples 38 through 43, wherein the base station is configured to receive at least one of the one or more signals of the one or more signal types from the UE starting in any symbol of a slot used by the UE to send the at least one of the one or more signals.

Example 45 may include the method of any of Examples 38 through 44, wherein the UE capability information message further indicates that a signal of one of the one or more signal types may be sent by the UE according to one or more of an inter-slot frequency hopping scheme, an intra-slot frequency hopping scheme, and a slot repetition scheme.

Example 46 may include the method of any of Examples 38 through 45, wherein the UE capability information message further indicates that signals of each of at least two signal types can be sent by the UE for UL positioning measurements within one of a same time resource, a same frequency resource, and a same time and frequency resource, the at least two signal types comprising at least one of the indicated one or more signal types.

Example 47 may include the method of Example 46, wherein the UE capability information message further indicates a maximum supported number of signals of the at least two signal types that can be sent by the UE for UL positioning measurements within the one of the same time resource, the same frequency resource, and the same time and frequency resource.

Example 48 may include the method of Example 46, wherein the UE capability information message further indicates a maximum supported number of signals of a first of the at least two signal types that can be sent by the UE for UL positioning measurements within the one of the same time resource, the same frequency resource, and the same time and frequency resource.

Example 49 may include the method of Example 48, wherein the UE capability information message further indicates a maximum supported number of signals of a second of the at least two signal types that can be sent by the UE for UL positioning measurements within the one of the same time resource, the same frequency resource, and the same time and frequency resource.

Example 50 may include an apparatus comprising means to perform one or more elements of a method described in or related to any of the above Examples, or any other method or process described herein.

Example 51 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 52 may include an apparatus comprising logic, modules, or circuitry to perform one or more elements of a method described in or related to any of the above Examples, or any other method or process described herein.

Example 53 may include a method, technique, or process as described in or related to any of the above Examples, or portions or parts thereof.

Example 54 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 55 may include a signal as described in or related to any of the above Examples, or portions or parts thereof.

Example 56 may include a datagram, packet, frame, segment, protocol data unit (PDU), or message as described in or related to any of the above Examples, or portions or parts thereof, or otherwise described in the present disclosure.

Example 57 may include a signal encoded with data as described in or related to any of the above Examples, or portions or parts thereof, or otherwise described in the present disclosure.

Example 58 may include a signal encoded with a datagram, packet, frame, segment, PDU, or message as described in or related to any of the above Examples, or portions or parts thereof, or otherwise described in the present disclosure.

Example 59 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 60 may include a computer program comprising instructions, wherein execution of the program by a processing element is to cause the processing element to carry out the method, techniques, or process as described in or related to any of the above Examples, or portions thereof.

Example 61 may include a signal in a wireless network as shown and described herein.

Example 62 may include a method of communicating in a wireless network as shown and described herein.

Example 63 may include a system for providing wireless communication as shown and described herein.

Example 64 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE), comprising:
generating a UE capability information message indicating one or more signal types that the UE can send for uplink (UL) positioning measurements;
sending, to a base station, the UE capability information message; and
sending, to the base station, one or more signals of the one or more signal types;
wherein the UE capability information message further indicates that signals of each of at least two signal types can be sent by the UE for UL positioning measurements in one of a same time resource, a same frequency resource, and a same time and frequency resource, the at least two signal types comprising at least one of the indicated one or more signal types.

2. The method of claim 1, wherein the one or more signal types comprises sounding reference signal for multiple input multiple output (mimo-SRS).

3. The method of claim 2, further comprising receiving, from the base station, an indication of a subset of mimo-SRS sent by the UE that can be used for UL positioning measurements.

4. The method of claim 1, wherein the one or more signal types comprises a physical random access channel (PRACH).

5. The method of claim 1, wherein the one or more signal types comprises physical uplink shared channel demodulation reference signal (PUSCH DMRS).

6. The method of claim 1, wherein the UE is configured to send at least one of the one or more signals of the one or more signal types to the base station starting in any symbol of a slot used by the UE to send the at least one of the one or more signals.

7. The method of claim 1, wherein the UE capability information message further indicates that a signal of one of the one or more signal types can be sent by the UE according to one or more of an inter-slot frequency hopping scheme, an intra-slot frequency hopping scheme, and a slot repetition scheme.

8. The method of claim 1, wherein the UE capability information message further indicates a maximum supported number of signals of the at least two signal types that can be sent by the UE for UL positioning measurements within the one of the same time resource, the same frequency resource, and the same time and frequency resource.

9. The method of claim 1, wherein the UE capability information message further indicates, to the base station, a maximum supported number of signals of a first of the at least two signal types that can be sent by the UE for UL positioning measurements within the one of the same time resource, the same frequency resource, and the same time and frequency resource.

10. The method of claim 9, wherein the UE capability information further indicates a maximum supported number of signals of a second of the at least two signal types that can be sent by the UE for UL positioning measurements within the one of the same time resource, the same frequency resource, and the same time and frequency resource.

11. A method of a base station, comprising:
receiving, from a user equipment (UE), a UE capability information message indicating one or more signal types that the UE can send for uplink (UL) positioning measurements;
receiving, from the UE, one or more signals of the one or more signal types; and
performing a UL positioning measurement using the one or more signals;
wherein the UE capability information message further indicates that signals of each of at least two signal types can be sent by the UE for UL positioning measurements in one of a same time resource, a same frequency resource, and a same time and frequency resource, the at least two signal types comprising at least one of the indicated one or more signal types.

12. The method of claim 11, wherein the UL positioning measurement is performed by the base station as part of one of an UL angle of arrival (UL-AoA) positioning method, a UL-time difference of arrival (UL-TDOA) positioning method, and a multi-round trip time (Multi-RTT) positioning method.

13. The method of claim 12, wherein the one or more signal types comprises sounding reference signal for multiple input multiple output (mimo-SRS).

14. The method of claim 13, further comprising sending, to the UE, an indication of a subset of mimo-SRS sent by the UE that can be used for UL positioning measurements.

15. The method of claim 11, wherein the one or more signal types comprises a physical random access channel (PRACH) or a physical uplink shared channel demodulation reference signal (PUSCH DMRS).

16. The method of claim 11, wherein the base station is configured to receive at least one of the one or more signals of the one or more signal types from the UE starting in any symbol of a slot used by the UE to send the at least one of the one or more signals.

17. The method of claim 11, wherein the UE capability information message further indicates that a signal of one of the one or more signal types can be sent by the UE according to one or more of an inter-slot frequency hopping scheme, an intra-slot frequency hopping scheme, and a slot repetition scheme.

18. The method of claim 11, wherein the UE capability information message further indicates a maximum supported number of signals of the at least two signal types that can be sent by the UE for UL positioning measurements within the one of the same time resource, the same frequency resource, and the same time and frequency resource.

* * * * *